United States Patent
Yamamoto et al.

(10) Patent No.: US 7,558,584 B2
(45) Date of Patent: *Jul. 7, 2009

(54) LOCATION REPORTING METHOD AND RELATED MOBILE COMMUNICATION TERMINAL

(75) Inventors: Hiroyuki Yamamoto, Kanagawa (JP); Masaaki Maeda, Tokyo (JP); Koichi Takahara, Tokyo (JP); Masahiro Kaiwa, Funabashi (JP); Yoichi Tanibayashi, Fujisawa (JP); Kaoru Nakajima, Yokohama (JP); Junko Matsuo, Koganei (JP); Kazunori Kosuge, Yokohama (JP); Katsutoshi Murata, Kunitachi (JP)

(73) Assignee: NTT DoCoMo, Inc., Tokyo (JP)

( * ) Notice: Subject to any disclaimer, the term of this patent is extended or adjusted under 35 U.S.C. 154(b) by 1354 days.

This patent is subject to a terminal disclaimer.

(21) Appl. No.: 09/980,434

(22) PCT Filed: Mar. 30, 2001

(86) PCT No.: PCT/JP01/02804

§ 371 (c)(1),
(2), (4) Date: Nov. 28, 2001

(87) PCT Pub. No.: WO01/74102

PCT Pub. Date: Oct. 4, 2001

(65) Prior Publication Data

US 2002/0138650 A1 Sep. 26, 2002

(30) Foreign Application Priority Data

Mar. 31, 2000 (JP) .............................. 2000-099926

(51) Int. Cl.
*H04W 24/00* (2009.01)

(52) U.S. Cl. .............. 455/456.5; 455/456.1; 455/456.3; 455/456.6; 455/466; 455/457; 709/203; 709/245; 701/200

(58) Field of Classification Search .............. 455/456.3, 455/456.2, 456.5, 456.6, 457, 566, 404.2, 455/414.1, 426.1, 456.1, 5, 414.3, 466; 342/357.09, 342/357.1; 340/539.13, 991–993; 709/227–228, 709/245; 701/200
See application file for complete search history.

(56) References Cited

U.S. PATENT DOCUMENTS 5,043,736 A * 8/1991 Darnell et al. ........... 342/357.1

(Continued)

FOREIGN PATENT DOCUMENTS

GB 2 322 248 A 8/1998

(Continued)

OTHER PUBLICATIONS

Second Official Action, dated Sep. 5, 2008, in corresponding Chinese Patent Application No. 018015328. (An English language translation is also enclosed.).

*Primary Examiner*—Sharad Rampuria
(74) *Attorney, Agent, or Firm*—Brinks Hofer Gilson & Lione

(57) ABSTRACT

Menu data supplied from an IP server 500 to a mobile station 101 is embedded with a location information substitution data string "NULLAREA" together with a URL of a particular IP server 500. The mobile station 101, upon detection of the location information substitution data string from a menu data selected by the user, determines whether location information can be transmitted to the IP server 500. In the case where the determination is that the transmission is permitted, the mobile station 101 detects its location information and, after substituting the location information for the location information substitution data string, transmits the data to the IP server 500.

62 Claims, 24 Drawing Sheets

U.S. PATENT DOCUMENTS

| | | | | |
|---|---|---|---|---|
| 5,128,981 | A * | 7/1992 | Tsukamoto et al. | 455/450 |
| 5,223,844 | A * | 6/1993 | Mansell et al. | 342/357.07 |
| 5,337,242 | A | 8/1994 | Yamamoto et al. | 364/449 |
| 5,434,904 | A | 7/1995 | Tsuzuki et al. | 379/58 |
| 5,479,482 | A * | 12/1995 | Grimes | 455/556.1 |
| 5,502,758 | A | 3/1996 | Tsuzuki et al. | 379/58 |
| 5,548,586 | A * | 8/1996 | Kito et al. | 370/349 |
| 5,579,535 | A * | 11/1996 | Orlen et al. | 455/421 |
| 5,636,122 | A * | 6/1997 | Shah et al. | 701/207 |
| 5,652,570 | A * | 7/1997 | Lepkofker | 340/573.4 |
| 5,689,548 | A * | 11/1997 | Maupin et al. | 455/404.1 |
| 5,727,057 | A * | 3/1998 | Emery et al. | 379/201.07 |
| 5,740,539 | A | 4/1998 | Ishii | 455/456 |
| 5,768,509 | A | 6/1998 | Gunluk | 709/203 |
| 5,774,802 | A * | 6/1998 | Tell et al. | 455/408 |
| 5,787,359 | A | 7/1998 | Nagata | 455/517 |
| 5,802,469 | A * | 9/1998 | Nounin et al. | 455/422.1 |
| 5,802,492 | A * | 9/1998 | DeLorme et al. | 455/456.5 |
| 5,867,110 | A | 2/1999 | Naito et al. | 340/995 |
| 5,873,040 | A * | 2/1999 | Dunn et al. | 455/456.2 |
| 5,889,492 | A | 3/1999 | Kurby et al. | |
| 5,889,770 | A * | 3/1999 | Jokiaho et al. | 370/337 |
| 5,915,207 | A * | 6/1999 | Dao et al. | 455/9 |
| 5,930,699 | A * | 7/1999 | Bhatia | 455/456.3 |
| 5,959,577 | A * | 9/1999 | Fan et al. | 342/357.13 |
| 6,002,936 | A * | 12/1999 | Roel-Ng et al. | 455/456.4 |
| 6,052,597 | A * | 4/2000 | Ekstrom | 455/456.3 |
| 6,073,013 | A * | 6/2000 | Agre et al. | 455/428 |
| 6,078,818 | A * | 6/2000 | Kingdon et al. | 455/456.5 |
| 6,091,956 | A * | 7/2000 | Hollenberg | 455/456.5 |
| 6,091,958 | A * | 7/2000 | Bergkvist et al. | 455/456.4 |
| 6,115,611 | A * | 9/2000 | Kimoto et al. | 455/456.3 |
| 6,122,520 | A * | 9/2000 | Want et al. | 455/456.2 |
| 6,138,003 | A | 10/2000 | Kingdon et al. | 455/410 |
| 6,169,897 | B1 * | 1/2001 | Kariya | 455/456.3 |
| 6,208,866 | B1 * | 3/2001 | Rouhollahzadeh et al. | 455/456.5 |
| 6,226,522 | B1 * | 5/2001 | Higuchi | 455/456.5 |
| 6,292,743 | B1 * | 9/2001 | Pu et al. | 701/202 |
| 6,295,454 | B1 * | 9/2001 | Havinis et al. | 455/456.3 |
| 6,311,060 | B1 * | 10/2001 | Evans et al. | 455/426.1 |
| 6,332,127 | B1 * | 12/2001 | Bandera et al. | 705/14 |
| 6,353,398 | B1 * | 3/2002 | Amin et al. | 340/995.12 |
| 6,377,793 | B1 * | 4/2002 | Jenkins | 455/412.1 |
| 6,381,465 | B1 * | 4/2002 | Chern et al. | 455/466 |
| 6,385,465 | B1 * | 5/2002 | Yoshioka | 455/564 |
| 6,397,057 | B1 * | 5/2002 | Malackowski et al. | 455/414.1 |
| 6,400,956 | B1 * | 6/2002 | Richton | 455/456.3 |
| 6,470,181 | B1 * | 10/2002 | Maxwell | 455/413 |
| 6,473,621 | B1 * | 10/2002 | Heie | 455/466 |
| 6,484,096 | B2 * | 11/2002 | Wong et al. | 701/213 |
| 6,496,701 | B1 | 12/2002 | Chen et al. | 455/456 |
| 6,505,048 | B1 * | 1/2003 | Moles et al. | 455/456.1 |
| 6,519,466 | B2 * | 2/2003 | Pande et al. | 455/456.1 |
| 6,522,265 | B1 | 2/2003 | Hillman et al. | 340/988 |
| 6,556,997 | B1 * | 4/2003 | Levy | 707/10 |
| 6,580,904 | B2 | 6/2003 | Cox et al. | 455/414 |
| 6,609,005 | B1 * | 8/2003 | Chern | 455/457 |
| 6,677,894 | B2 * | 1/2004 | Sheynblat et al. | 342/357.1 |
| 6,731,940 | B1 * | 5/2004 | Nagendran | 455/456.1 |
| 6,819,919 | B1 * | 11/2004 | Tanaka | 455/414.1 |
| 6,873,850 | B2 * | 3/2005 | Dowling et al. | 455/456.1 |
| 6,917,968 | B2 * | 7/2005 | Nakamura | 709/217 |
| 6,983,139 | B2 * | 1/2006 | Dowling et al. | 455/414.2 |
| 7,010,306 | B1 * | 3/2006 | Tanibayashi et al. | 455/456.1 |
| 7,421,275 | B1 * | 9/2008 | Hancock et al. | 455/456.1 |
| 2001/0032254 | A1 * | 10/2001 | Hawkins | 709/219 |
| 2001/0041576 | A1 * | 11/2001 | I'Anson et al. | 455/456 |
| 2001/0044310 | A1 * | 11/2001 | Lincke | 455/456 |
| 2002/0077130 | A1 * | 6/2002 | Owensby | 455/466 |
| 2002/0177449 | A1 * | 11/2002 | McDonnell et al. | 455/456 |
| 2003/0069029 | A1 * | 4/2003 | Dowling et al. | 455/456 |

FOREIGN PATENT DOCUMENTS

| | | | |
|---|---|---|---|
| GB | 2322248 A * | 8/1998 | |
| JP | 63-199528 | 8/1988 | |
| JP | 3-120995 | 5/1991 | |
| JP | 4-213258 | 8/1992 | |
| JP | 5-83189 | 4/1993 | |
| JP | 5-102906 | 4/1993 | |
| JP | 06-165246 | 6/1994 | |
| JP | 6-261150 | 9/1994 | |
| JP | 07-105494 | 4/1995 | |
| JP | 07-131852 | 5/1995 | |
| JP | 07-312774 | 11/1995 | |
| JP | 08-37682 | 2/1996 | |
| JP | 8-289355 | 11/1996 | |
| JP | 9-054895 | 2/1997 | |
| JP | 9-153054 | 6/1997 | |
| JP | 9-172672 | 6/1997 | |
| JP | 09-215041 | 8/1997 | |
| JP | 10-148542 | 6/1998 | |
| JP | 10-164643 | 6/1998 | |
| JP | 10-170625 | 6/1998 | |
| JP | 10-171727 | 6/1998 | |
| JP | 10-191409 | 7/1998 | |
| JP | 10-221106 | 8/1998 | |
| JP | 2868500 | 12/1998 | |
| JP | 11-27728 | 1/1999 | |
| JP | 11-27729 | 1/1999 | |
| JP | 11-41276 | 2/1999 | |
| JP | 11-51678 | 2/1999 | |
| JP | 11-53278 | 2/1999 | |
| JP | 11-94923 | 4/1999 | |
| JP | 2908406 | 4/1999 | |
| JP | 11-133135 | 5/1999 | |
| JP | 11-155025 | 6/1999 | |
| JP | 11-178047 | 7/1999 | |
| JP | 11-351903 | 12/1999 | |
| JP | 2000-4482 | 1/2000 | |
| JP | 2000-55686 | 2/2000 | |
| KR | 1998-031026 | 7/1998 | |
| WO | WO 98/00988 | 1/1998 | |
| WO | WO 98/54922 | 12/1998 | |
| WO | WO 99/46949 | 9/1999 | |
| WO | WO 00/13336 | 3/2000 | |

* cited by examiner

FIG. 3

| IP SERVER NAME | HOST NAME (URL) | SERVICE NAME | LOCATION INFORMATION DISCLOSURE FLAG | USER PERMIT FLAG |
|---|---|---|---|---|
| IP SERVER 500A | xxx.co.jp | LOCATION-RELATED INFORMATION PROVIDING SERVICE | ON | ON |
| IP SERVER 500B | yyy.co.jp | LOCATION-RELATED INFORMATION PROVIDING SERVICE | ON | |
| IP SERVER 500C | zzz.co.jp | WIDE AREA INFORMATION PROVIDING SERVICE | OFF | |
| ... | ... | ... | ... | |
| ... | ... | ... | ... | |
| ... | ... | ... | ... | |
| ... | ... | ... | ... | |

FIG. 4A

```
<HTML>
<TITLE> INFORMATION ON YOUR NEARBY SHOPS </TITLE>
<BODY>
WE OFFER VARIOUS SHOPS LOCATED NEAR YOUR PRESENT LOCATION. <BR>
<A HREF="http://xxx.co.jp/cgi-bin/restaurant.cgi?area=NULLAREA">RESTAURANT INFORMATION</A><BR>
<A HREF="http://xxx.co.jp/cgi-bin/movie.cgi?area=NULLAREA">MOVIE THEATER INFORMATION</A><BR>
<A HREF="http://xxx.co.jp/cgi-bin/artmuseum.cgi?area=NULLAREA">ART MUSEUM INFORMATION</A><BR>
<A HREF="http://xxx.co.jp/cgi-bin/pushregist.cgi?uid=NULLID">FOLLOW-UP INFORMATION SUPPLY REGISTRATION</A><BR>
<A HREF="http://xxx.co.jp/about.html">ABOUT THIS SERVICE</A><BR>
</BODY>
</HTML>
```

FIG. 4B

WE OFFER INFORMATION ON VARIOUS SHOPS LOCATED NEAR YOUR PRESENT LOCATION.

RESTAURANT INFORMATION

MOVIE THEATER INFORMATION

ART MUSEUM INFORMATION

FOLLOW-UP INFORMATION SUPPLY

REGISTRATION

ABOUT THIS SERVICE

FIG. 6

| AREA CODE | AREA NAME | LOCATION-RELATED INFORMATION | | | | | |
|---|---|---|---|---|---|---|---|
| | | BUILDING NAME | ADDRESS | PHONE NUMBER | EVENT | OTHER | INFORMATION |
| CODE001 | 1-CHOME, SHIBUYA-KU | RESTAURANT A | ... | ... | ... | ... | ... |
| | | ... | ... | ... | ... | ... | ... |
| | | MOVIE THEATER B | ... | ... | ... | ... | ... |
| | | ... | ... | ... | ... | ... | ... |
| | | ART MUSEUM C | ... | ... | ... | ... | ... |
| | | ... | ... | ... | ... | ... | ... |
| ... | ... | ... | ... | ... | ... | ... | ... |
| ... | ... | ... | ... | ... | ... | ... | ... |
| ... | ... | ... | ... | ... | ... | ... | ... |
| ... | ... | ... | ... | ... | ... | ... | ... |

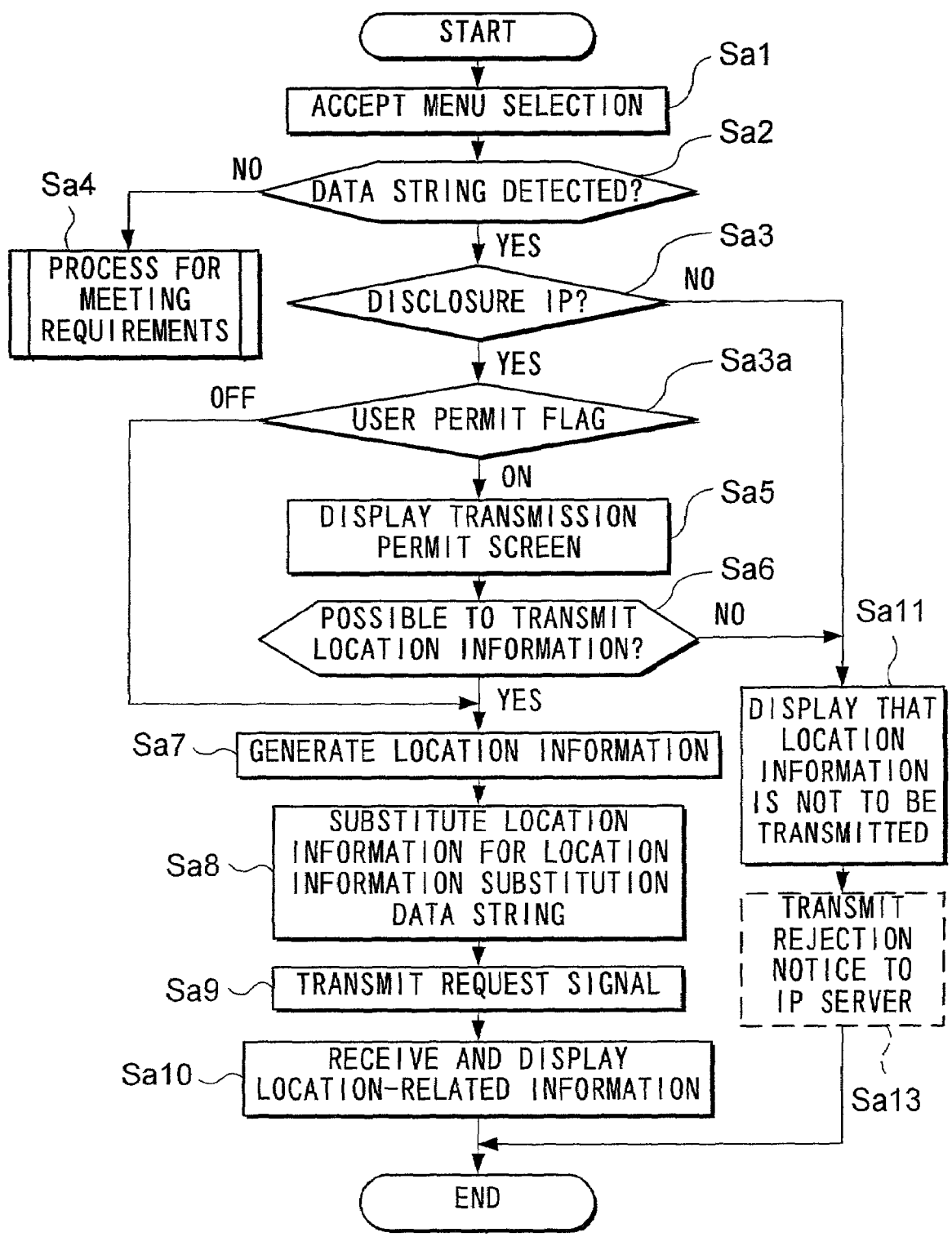

FIG. 8A

LOCATION INFORMATION DATA BASE

| LOCATION INFORMATION | | OCCUPANT INFORMATION | |
|---|---|---|---|
| | | CATEGORY | NAME OF OCCUPANT |
| LINE p0—p1 | △0 | EXPRESSWAY | TOMEI EXPRESSWAY |
| LINE p0—p1 | △1 | | |
| ...... | ...... | | |
| LINE p3—p$_{n-1}$ | △$_{n-1}$ | | |
| ...... | ...... | ...... | ...... |
| POINT q0 | r0 | SHOPPING | ×××TOWER SHOPPING FLOOR |
| POINT q1 | r1 | RESTAURANT | ×××TOWER RESTAURANT |
| ...... | ...... | ...... | ...... |
| POINT q$_{m-1}$ | r$_{m-1}$ | MEETING ROOM | ×××TOWER MEETING ROOM A |
| POINT q(NO z) | r | BUILDING | ×××TOWER |

| CATEGORY | STATE |
|---|---|
| EXPRESSWAY | MOVING |
| RAILROAD | MOVING |
| SEA | MOVING |
| PEDESTRIAN WALK | MOVING |
| SHOPPING | SHOPPING |
| RESTAURANT | DINING |
| MEETING ROOM | MEETING |
| ...... | ...... |
| ...... | ...... |

| MOBILE STATION ID | LOCATION INFORMATION DISCLOSURE IP SERVER |
|---|---|
| MS09011111111 | IP SERVER 500A |
|  | IP SERVER 500B |
|  | IP SERVER 500H |
|  | ......... |
| MS09011111112 | IP SERVER 500D |
|  | IP SERVER 500M |
|  | ......... |
| ......... | ......... |
|  |  |
|  |  |
|  |  |

FIG. 11

| MOBILE STATION ID NOT DISCLOSING LOCATION INFORMATION |
|---|
| MS09011111122 |
| MS09011155555 |
| ......... |
| ......... |
| ......... |
| ......... |

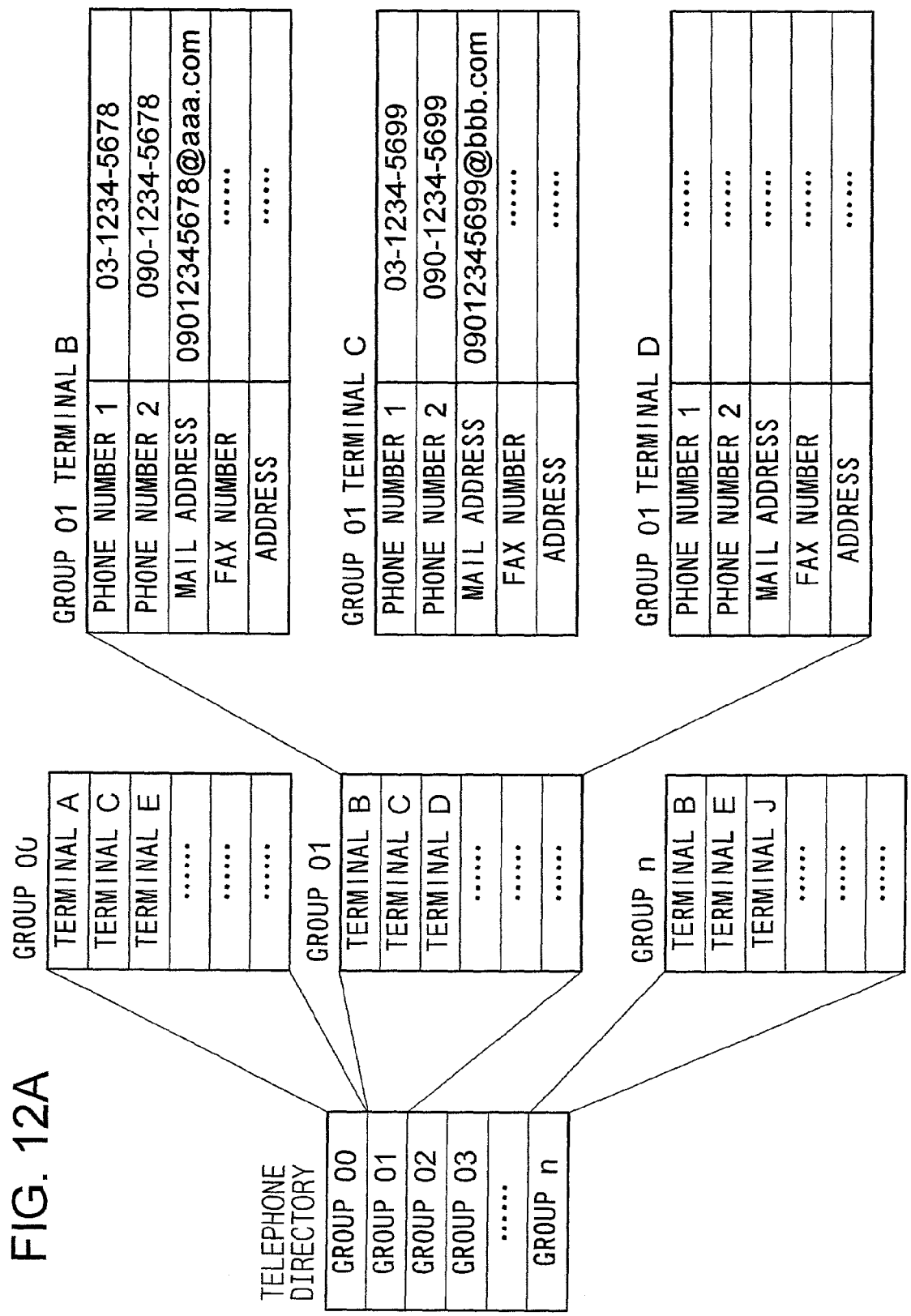

FIG. 12B

DESTINATION GROUP ACCESS TABLE

| TERMINAL | GROUP NO. | | | | | |
|---|---|---|---|---|---|---|
| | 00 | 01 | 02 | 03 | 04 | ...... |
| TERMINAL A | NOT ACCESSIBLE | ACCESSIBLE | NOT ACCESSIBLE | NOT ACCESSIBLE | ACCESSIBLE | ...... |
| TERMINAL E | NOT ACCESSIBLE | NOT ACCESSIBLE | ACCESSIBLE | NOT ACCESSIBLE | NOT ACCESSIBLE | ...... |
| TERMINAL F | ACCESSIBLE | NOT ACCESSIBLE | NOT ACCESSIBLE | ACCESSIBLE | NOT ACCESSIBLE | ...... |
| ...... | | | | | | |
| ...... | | | | | | |

FIG. 16

```
http://xxx.co.jp/cgi-bin/resutaurant.cgi?area = NULLAREA(·gps)
http://xxx.co.jp/cgi-bin/move.cgi?area =NULLAREA(·bs)
```

FIG. 18

| BASE STATION ID | AREA CODE |
|---|---|
| BS001～BS005 | CODE001 |
| ...... | ...... |
| ...... | ...... |
| ...... | ...... |
| ...... | ...... |
| ...... | ...... |

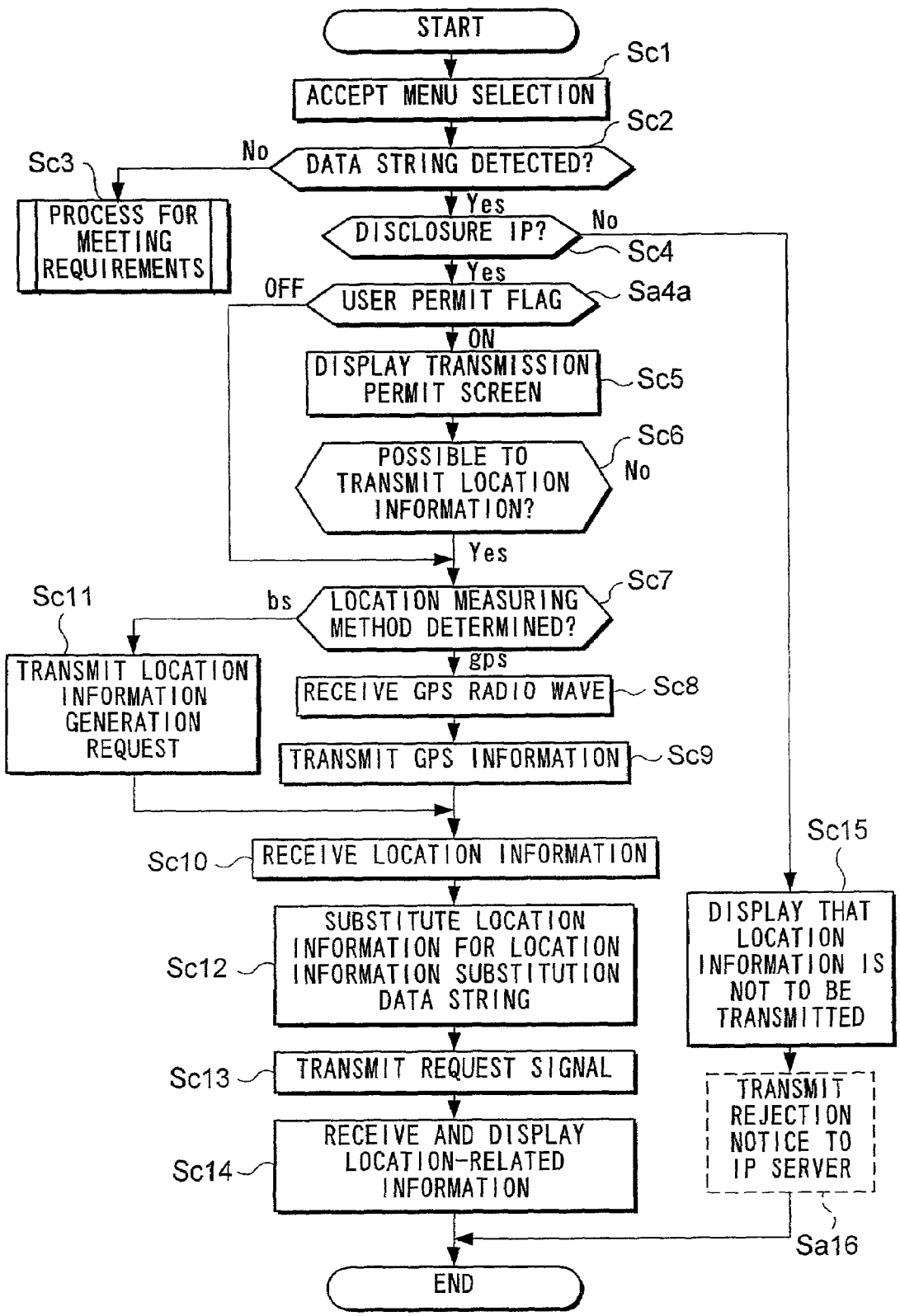

FIG. 20A

| | LOCATION MEASURING METHOD | NOTE | ACCURACY | TIME |
|---|---|---|---|---|
| G4 | GPS | FOUR SATELLITES | HIGH | VERY DETERIORATED |
| G3 | GPS | THREE SATELLITES | STANDARD | DETERIORATED |
| G2 | GPS | TWO SATELLITES | LOW | NOT SO DETERIORATED |
| B3 | BTS | THREE BASE STATIONS | STANDARD | RATHER IMPROVED |
| B2 | BTS | TWO BASE STATIONS | LOW | MUCH IMPROVED |

FIG. 20B

| PARAMETER | CONTENTS |
|---|---|
| T | PRIORITY TO TIME |
| A | PRIORITY TO ACCURACY |
| TG | PRIORITY TO TIME WITH GPS |
| AB | PRIORITY TO ACCURACY WITH BTS |

FIG. 21A

1. NOTIFY SELF LOCATION
   DESTINATION
   [09012345678]

[ENTER] [CLEAR]

FIG. 21B

LOCATION INFORMATION OF DESTINATION TO BE ACQUIRED?

[YES] [NO]
[TRANSMIT] [CLEAR]

LOCATION REPORTING METHOD AND RELATED MOBILE COMMUNICATION TERMINAL

TECHNICAL FIELD

The present invention relates to a location reporting method and a mobile communication terminal for reporting the location of the mobile communication terminal.

BACKGROUND ART

The mobile communication network such as the cellular telephone is capable of detecting the current location of a mobile communication terminal. In recent years, various systems have been proposed for providing information service utilizing the location information acquired by the mobile communication network of the type described above. One of the services of this type using a PHS (Personal Handy-phone System) is the location information service for providing the current location search service for measuring and reporting the current location of the object of location measurement such as an aged person or an infant, the service for distributing the contents related to the current location, or the service related to the current location of a user or a person other than the user making up an object of measurement.

For carrying out the location information service, the current location of the person of which the location is to be measured is required to be measured. Generally, this location measurement is carried out by causing the person of which the location is to be measured to hold a mobile communication terminal such as a portable terminal, a PHS, a PDA or the like having the communication/location measuring function, and causing a location measuring device to transmit signals to and from the mobile communication terminal for location measurement. The method of location measurement varies depending on the type of the mobile communication terminal held by the person of which the location is to be measured. For this reason, the conventional service providers for providing the location information service have provided the location information service only for the persons holding a mobile communication terminal of a specific type. Also, in providing the location information service to a great number of persons holding various mobile communication terminals, the service provider is required to prepare the location measuring means of various types to meet the requirements of the mobile communication terminals, thereby posing the problem of an increased cost of providing the location information service. Also, depending on the contents of the location information service, the requested location information may be required to be expressed in different forms. For example, a given service is desirably provided as the location information expressed by the latitude and longitude while another service is preferably provided by the location information expressed by an address (character string). In such a case, the location information service provider is required to prepare means for generating the location information in the form of expression suitable for each service provided. Under the circumstances, this imposes a large burden on the service provider for providing the location information service. Also, the user wanting to receive the service is required to take the trouble of specifying the method of location measurement and the method of accessing the contents in accordance with the method employed by the service provider.

DISCLOSURE OF THE INVENTION

The present invention which has been achieved with the aforementioned situation as a background, and an object of the present invention is to propose an interface protocol for supplying various computers with the location information of a mobile communication terminal to provide a common platform for supplying the location information with the aim of integrating networks.

Further, for supplying various computers with the location information of a mobile communication terminal in an open form, a new problem of the privacy of the user is encountered and requires a sufficient security measure to handle the problem.

In view of this, another object of the present invention is to supply the computers with the location information of a mobile communication terminal while at the same time maintaining the security for the particular information.

In order to solve the problem described above, according to the present invention, there is provided a location reporting method characterized by comprising the steps of: receiving by a mobile communication terminal, from a computer through a mobile communication network, down data containing a request for location information; acquiring by said mobile communication terminal location information indicating the location of itself; and transmitting, by said mobile communication terminal, after adding said acquired location information to said received data, said data to said computer as up data.

The transmission step is desirably for substituting the acquired location information for a predetermined character string contained in the down data and transmitting the data to the computer as up data.

According to this invention, the location information of a mobile communication terminal can be supplied to the computer as a standard interface protocol. Also, the advisability of whether the location information of a mobile communication terminal is to be disclosed or not is managed by a mobile communication network, and the security of the location information of the mobile communication terminal can be maintained.

BRIEF DESCRIPTION OF THE DRAWINGS

FIG. 3 is a data format diagram of the disclosure IP information data base stored in a mobile station according to the first embodiment.

FIG. 4A is a diagram showing an example of the submenu data of HTML format transmitted from an IP server to a mobile station according to the first embodiment.

FIG. 4B is a diagram showing a screen displayed on a mobile station based on the submenu data of HTML format shown in FIG. 4A according to the first embodiment.

FIG. 6 is a diagram showing a data format of the location-related information data base of the IP server according to the first embodiment.

FIG. 7 is a flowchart showing the operation of a microcomputer of a mobile station according to the first embodiment.

FIG. 8A is a diagram showing a data format of the location information data base of a mobile station according to the first embodiment.

FIG. 11 is a diagram showing a data format of a data base included in a node of a network according to a modification of the first embodiment.

FIGS. 12A and 12B are diagrams showing a data format of a data base included in a mobile station according to a modification of the first embodiment.

FIG. 16 is a diagram showing an example of a hyper link character string according to a third embodiment of the invention.

FIG. 18 is a diagram showing a data format of an area code table included in a gateway server according to the third embodiment.

FIG. 19 is a flowchart showing the operation of a microcomputer of a mobile station according to the third embodiment.

FIGS. 20A and 20B are diagrams showing a data format included in a mobile station according to a modification of the third embodiment.

FIGS. 21A and 21B are diagrams showing the screens displayed on a mobile station according to a fourth embodiment of the invention.

BEST MODE FOR CARRYING OUT THE INVENTION

Embodiments of the present invention will be explained below with reference to the drawings.

The embodiments described below, however, are only an example of the invention, and the present invention can be modified in various ways within the scope of the technical concept thereof.

A: FIRST EMBODIMENT

A-1: Configuration of First Embodiment (1) Configuration of Entire System

Figure 1:
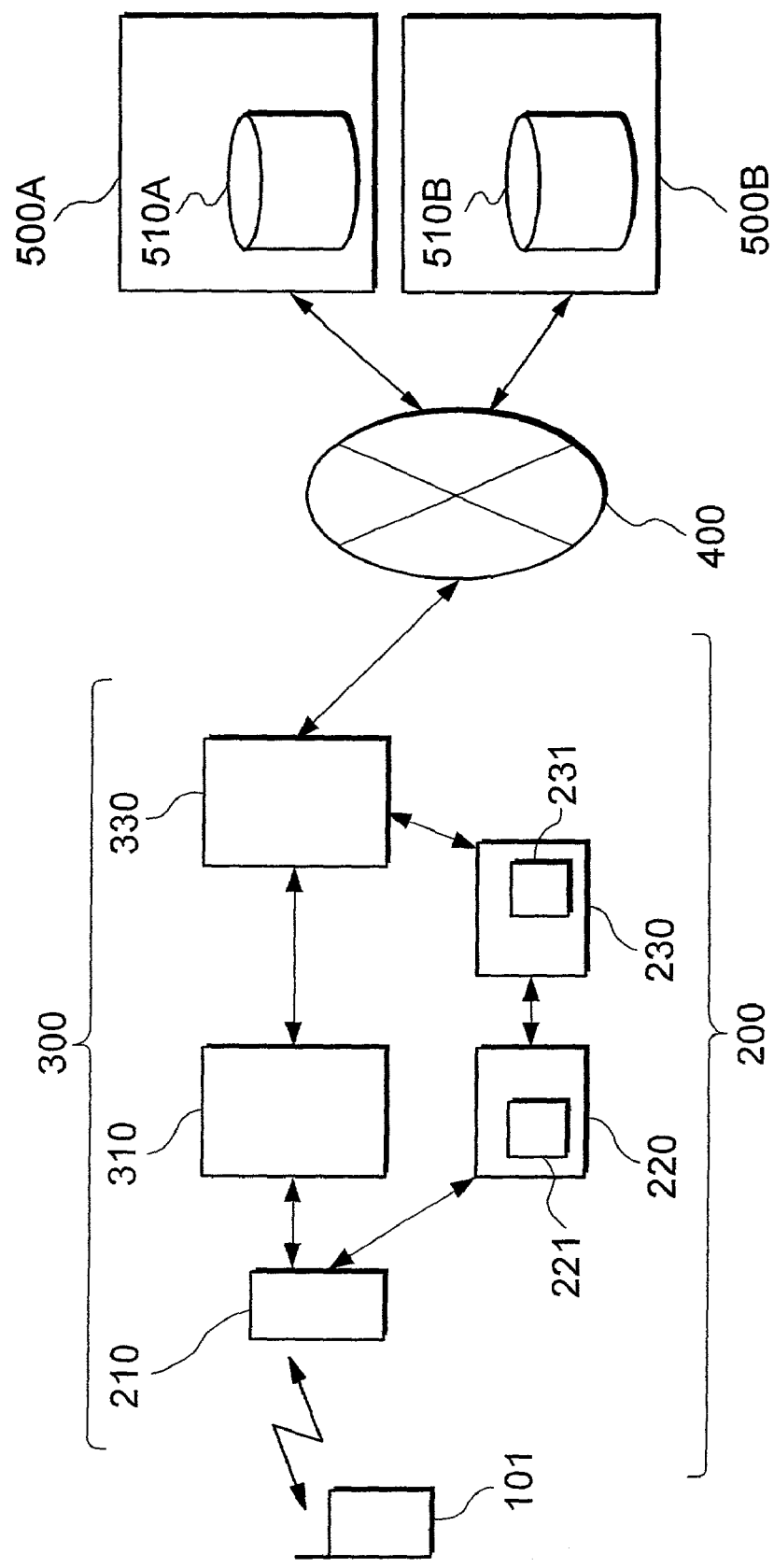
FIG. 1 is a block diagram showing the configuration of an entire system according to a first embodiment of the present invention.

FIG. 1 is a block diagram showing a configuration of an entire mobile communication system used in the first embodiment.

This mobile communication system comprises a mobile station 101, a mobile telephone network 200, a mobile packet communication network 300, the Internet 400, IP servers 500A, 500B and so on. In this embodiment, the mobile packet communication network 300 and the mobile telephone network 200 are collectively called a mobile communication network.

Figure 2:
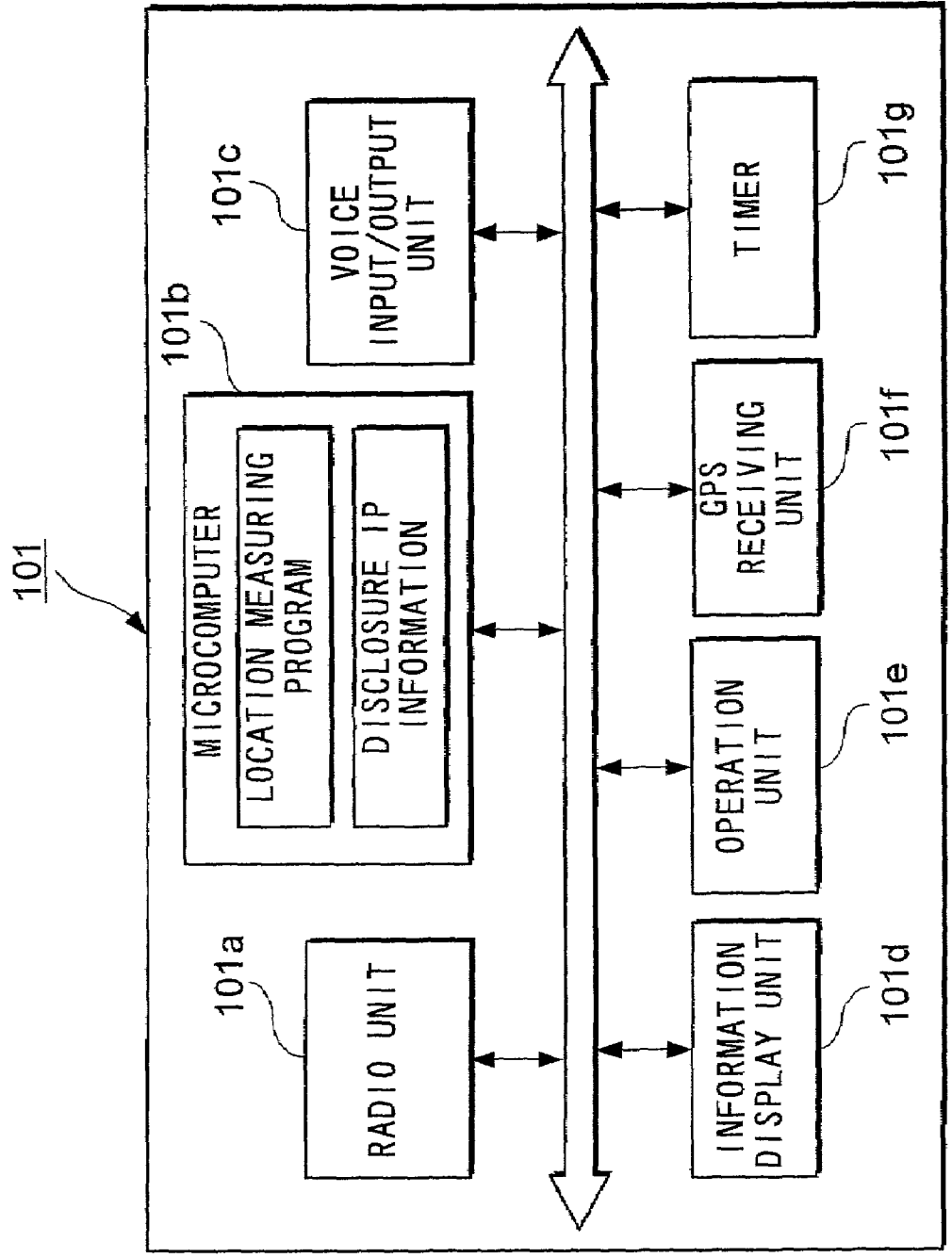
FIG. 2 is a diagram showing a configuration of a mobile station according to the first embodiment.

The mobile station 101 is a mobile communication terminal like a portable telephone or a PHS and receives a speech service of the mobile telephone network and a packet communication service of the mobile packet communication network 300. As shown in FIG. 2, this mobile station 101 includes a radio unit 101a for carrying out the radio communication with a base station of the mobile communication network, a voice input/output unit 110c for causing the user to carry out the voice communication, an information display unit 101d configured of a liquid crystal panel or the like, an operation unit 101e by way of which the operation is performed for inputting information such as numerals and characters, a GPS receiving unit 101f having an antenna and a receiver not shown, and a timer 101g. The mobile station 101 also has built therein a microcomputer 101b for controlling these various parts.

Further, the microcomputer 110b has stored therein software for browsing document data (what is called the browser), acquires data of HTML (HyperText Markup Language) (hereinafter referred to as the HTML data) from an information provider (hereinafter abbreviated as IP) through the mobile packet communication network 300, and based on these data, causes an interactive screen to be displayed on the information display unit 101d.

The memory (not shown) built in the microcomputer 101b has stored therein the location measuring program and the IP information. The location measuring program is for measuring the location based on the information contained in the radio wave received by the GPS receiving unit 101f, and the microcomputer 101b calculates the location information of the mobile station 101 by executing this location measuring program. In the process, the timer 101g is used for measuring the time at which the radio wave sent from a GPS satellite not shown is received by the GPS receiving unit 101f.

Also, the memory of the mobile station 101 has stored therein a disclosure IP information data base as shown in FIG. 3. The user of the mobile station 101 checks the service agreement screen supplied by the IP server 500 beforehand, and signs an agreement with the IP server 500 for receiving the location-related information service. Once this agreement is signed, the IP server 500 instructs the mobile station 101 to store the name of the host of the server in the disclosure IP information data base as disclosure IP information, and the mobile station 101 stores the same host name in the disclosure IP information data base in compliance with the instruction. The mobile station 101 determines whether the location information can be disclosed or not with reference to the disclosure IP information data base. This determination as to whether the location information can be disclosed or not based on the disclosure IP information is in order to prevent the transmission of the location information to an IP server 500 against the will of the user.

As shown in the drawing, the disclosure IP information data base has stored therein a "host name: URL (Uniform Resource Locator)", a "service name" and a "location information disclosure flag" for each "IP server name". Also, the disclosure IP information data base includes a "user permit flag".

The location information disclosure flag is set on for the IP server 500 to which the location information of the mobile station 101 is disclosed (i.e. the IP server 500 capable of acquiring the location information of the mobile station 101).

In the drawing, for example, the IP server 500A and the IP server 500B perform the service of providing the location-related information, and the IP server 500C provides the service of supplying wide area information.

The wide area information is defined as the information having the same contents regardless of the location where the party receiving the information is located, and the wide area information service is the one independent of the location information of the mobile station 101. The wide area information service includes the service of distributing news about the whole country. The location-related information service, on the other hand, is the one dependent on the location of the mobile station 101 for providing the aforementioned information on restaurants, for example.

As shown in the drawing, the IP server 500A and the IP server 500B can acquire the location information (i.e. the location information is disclosed to the IP server 500A and the IP server 500B), and therefore the location information disclosure flag is set in on state for them. The IP server 500C, on the other hand, cannot acquire the location information of the mobile station 101 (i.e. the location information is not disclosed to the IP server 500C), and therefore the location information disclosure flag is set off for the same.

The user permit flag is set the same way for all the IP servers 500 to which the location information of the mobile station 101 is disclosed, and set on in the case where the permission of the user of the mobile station 101 is required before the location information is disclosed to the IP server 500A or the IP server 500B for which the location information disclosure flag is set in on state. Some users may want the information on their location to be unknown to others. In such a case, in order to prevent the location information of the mobile station 101 from being disclosed to the IP servers 500A, 500B and so forth against the will of the user, the user can set the user permit flag on by a predetermined key operation. In the case where the user permit key is set off, on the other hand, the location information can be supplied unconditionally to the IP servers 500A and 500B for which the location information disclosure flag is set on.

As described above, even an IP server 500 to which the location information can be disclosed cannot always acquire the location information of the mobile station 100 without the permission of the user, and depending on the setting of the user permit flag, requires the permission of the user beforehand.

The flag information or the like which should constitute a reference for disclosure as described above is not available for the IP servers 500 not registered in the disclosure IP information data base. As for the IP servers 500 not registered in the disclosure IP information data base, the microcomputer 101b of the mobile station 101 determines that the location information disclosure flag is set in off state (i.e. the location information is not disclosed).

In FIG. 1, the mobile telephone network 200 is a communication network for providing the speech service to the mobile station 101, and the mobile station 101 can receive the speech service through this mobile telephone network 200 or the network 200 and a stationary telephone network not shown.

The mobile telephone network 200 comprises a base station 210, a switching station 220, a home memory 230 and a communication line connecting them.

A multiplicity of the base stations 210 are installed at intervals in a speech service area, and each base station 210 is assigned a base station ID. The base station 210 performs radio communication with the mobile station 101 located in each radio zone.

The switching station 220 accommodates a plurality of base stations 210 for performing the switching operation for the communication lines of the mobile stations 101 located in the radio zone of each base station. The switching station 220 includes a location information table 221 for detecting the mobile stations 101 located in the radio zone of each base station 210 accommodated in the particular switching station 220.

The home memory 230 has registered therein various information including the subscriber information, the location registration information, and the billing information as a data base.

The location registration information indicates an area in the network in which each mobile station 101 is located, and is stored in the location registration data base 231.

The mobile packet communication network 300 is for providing the packet communication service to the mobile stations 101, and includes a packet subscriber processing unit 310, a gateway server 330 and a communication line connecting them in addition to the base station 210, the switching station 220, the home memory 230, etc.

The packet subscriber processing units 310 are configured of computer systems included in the switching station 220, and each packet subscriber processing unit 310 has a unique packet subscriber processing unit ID.

The packet subscriber processing unit 310, at the request of the mobile station 101 for packet switching, confirms the validity of the packet switching request received, and performs the process of packet switching.

The gateway server 330 is a computer system installed in a mobile packet switching station (not shown) for connecting the mobile packet communication network 300 with other networks such as the Internet 400. The gateway server 330 acts as an intermediary for data transmission and reception between a plurality of networks while converting different communication protocols between the plurality of the networks. Specifically, the gateway server 330 converts the transmission protocol for the mobile packet communication network 300 and TCP/IP to each other. TCP/IP is a standard communication protocol for the Internet 400.

Also, the gateway server 330 holds the main menu screen data for presenting the menu of the various services supplied by the IP servers 500A, 500B and so on to the user of the mobile station 101, and transmits these data in compliance with the request from the mobile station 101. These main menu screen data are in HTML format, and each have embedded therein the URL including the names of the hosts of the IP servers 500A, 500B and so on executing the services corresponding to each menu item.

The IP servers 500A, 500B and so on make up a server system operated by the IP and send out the information to be supplied to the user, to the Internet 400 as data in HTML format.

According to this embodiment, the IP servers 500A, 500B and so on supply each mobile station 101 with the location-related information corresponding to the location of the mobile station 101, and are equipped with the location-related information data bases 510A, 510B and so on for storing various location-related information. The IP servers 500A, 500B and so on search the location-related information data bases 510A, 510B and so on based on the location information of the mobile station 101 notified from the mobile station 101, and transmit the location-related information obtained as the result of the search to the mobile station 101 through the Internet 400 or the like.

Also, the IP servers 500A, 500B and so on store the submenu screen data in HTML format for presenting to the user the menu of the services to be executed by themselves, and when the mobile station 101 accesses the IP servers 500A, 500B and so on, the submenu screen in store is transmitted to the mobile station 101.

FIG. 4A is a diagram showing an example of the submenu screen data in HTML format to be transmitted to the mobile station 101 by the IP servers 500A, 500B and so on, and FIG. 4B a diagram showing the submenu screen displayed on the mobile station 101 based on the particular screen data.

As shown in FIG. 4B, the submenu items include "restaurant information", "movie theater information", "art museum information" and "follow-up information supply registration". Of these submenu items, the "restaurant information", the "movie theater information" and the "art museum information" are for supplying the restaurant information, etc. to the user of the mobile station 101 in accordance with the location information of the mobile station 101.

The submenu items each have embedded therein a corresponding hyper link character string.

In the case where the user selects the "restaurant information" from the submenu screen shown in FIG. 4B, for example, the hyper link character string (refer to FIG. 4A) "http://xxx.co.jp/cgi-bin/restaurant.cgi?area=NULLAREA" embedded in the "restaurant information" is transmitted from the mobile station 101 to any one of the IP servers 500A, 500B and so on indicated by the host name "xxx.co.jp" through the gateway server 330 or the like.

The data string "NULLAREA" is contained in the last part of the hyper link character string. This data string "NULLAREA", which is substituted for by the location information of the mobile station 101 in the mobile station 101 and transmitted to the IP servers 500A, 500B and so on indicated by the host name, will hereinafter be referred to as the "location information substitution data string".

(2) Configuration of Gateway Server 330

Figure 5:
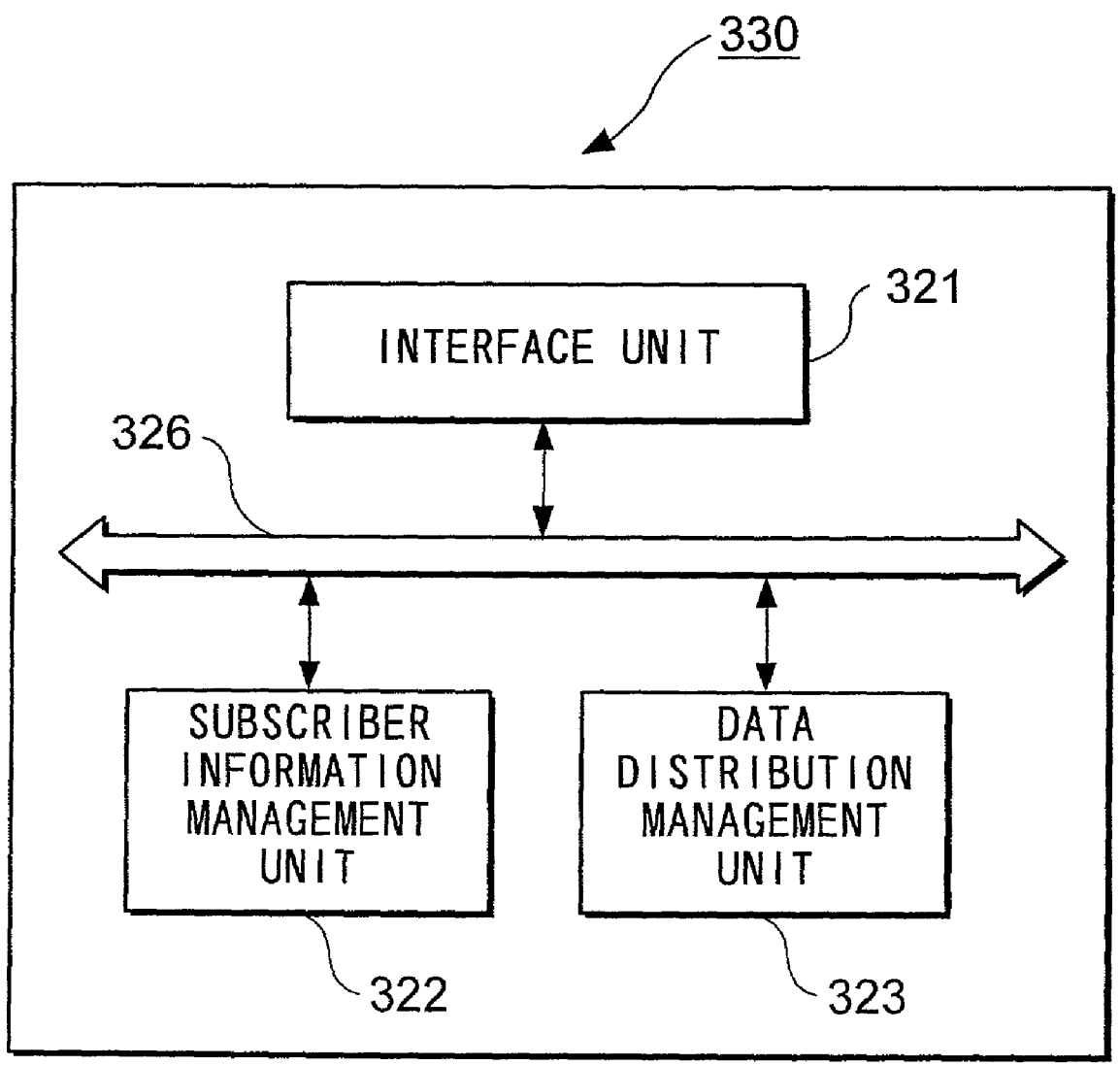
FIG. 5 is a block diagram showing a configuration of a gateway server according to the first embodiment.

FIG. 5 is a block diagram showing a configuration of the gateway server 330.

This gateway server 330 is configured of an interface unit 321, a subscriber information management unit 322, a data distribution management unit 323, a bus 326 for connecting them to each other, etc.

The interface unit 321 performs such functions of an interface between the networks as the protocol conversion between the mobile packet communication network 300 and the Internet 400 or other networks.

The subscriber information management unit 322 stores and manages the subscriber information obtained with reference to the home memory 230 described above.

The data distribution management unit 323 manages the data distribution processing between the mobile stations 101, between each mobile station 101 and the Internet 400 or other networks, or between each mobile station 101 and the IP servers 500A, 500B and so on.

Also, the data distribution management unit 323 stores the main menu screen data described above, and transmits the screen data to the mobile stations 101 in accordance with the request signal from the mobile station 101. The main menu items, for example, include the "location-related information service" for providing the information related to the location of the mobile station 101 and the "news distribution service" for distributing news.

The IP servers 500A, 500B and so on can be accessed by the mobile station 101 according to either of two methods including a method in which the user selects the desired main menu item from the main menu screen displayed on the mobile station 101 and a method in which the user directly inputs the URL of the desired one of the IP servers 500A, 500B and so on using the keypad of the mobile station 101.

In the case where the user selects the desired main menu item from the main menu screen displayed on the mobile station 101, the mobile station 101 transmits to the gateway server 330 the request signal including the URL embedded in the particular main menu item, and the data distribution management unit 323 of the gateway server 330 accesses one of the IP servers 500A, 500B and so on based on the host name of the URL contained in the request signal thus received.

In the case where the user directly inputs the URL of one of the IP servers 500A, 500B and so on he/she wants to access in the mobile station 101, on the other hand, the mobile station 101 transmits the input request signal containing the URL to the gateway server 330, and the data distribution management unit 323 of the gateway server 330 accesses one of the IP servers 500A, 500B and so on based on the host name of the URL contained in the request signal received.

Once the mobile station 101 accesses the IP servers 500A, 500B and so on by any one of the methods described above, the IP servers 500A, 500B and so on transmit the submenu screen stored therein to the mobile station 101.

(3) Configuration of Location-Related Information Data Base 510

FIG. 6 shows a diagram showing the format of the location-related information data bases 510A, 510B and so on included in the IP servers 500A, 500B and so on, respectively.

The location-related information data bases 510A, 510B and so on have stored therein the "area code" for each area, the "area name" and the "location-related information" corresponding to the area code.

The areas can be classified using one of various standards including the administrative classification of the municipalities, the postal code and the latitude/longitude. In the drawing, the area code "CODE001" indicates "1-chome, Shibuya-ku" which is an administrative classification, and the information including the "building name" such as the "restaurant", the "movie theater", the "art museum", etc. located at 1-chome, Shibuya-ku, the "address", the "telephone number" and the "event" are stored in the location-related information data base 510.

A-2: Operation of First Embodiment

Now, the operation of the first embodiment having the aforementioned configuration will be explained with reference to the flowchart shown in FIG. 7.

First, the user selects the desired main menu item from the main menu screen displayed on the mobile station 101, or directly inputs the URL of the desired one of the IP services 500A, 500B and so on in the mobile station 101. The mobile station 101 thus accesses one of the IP servers 500A, 500B and so on (for the present purpose, we assume that the IP server 500A (host name: xxx.co.jp) is accessed) corresponding to the particular menu item. Then, the IP server 500A, in response to the access from the mobile station 101, transmits the submenu screen data (the screen data shown in FIG. 4A, for example) in store to the mobile station 101 through the gateway server 330. When the mobile station 101 receives the particular submenu screen data, the microcomputer 101*b* displays the submenu screen (FIG. 4B) on the information display unit 101*d* based on the received data and starts the processing shown in FIG. 7.

From the submenu screen displayed on the information display unit 101*d*, the user selects the desired menu item by key operation. The process of the microcomputer 110*b* proceeds to step Sa1, and the key operation is accepted. We assume that the menu item "restaurant information", for example, has been selected from the menu shown in FIG. 4B.

Then, at step Sa2, the microcomputer 101*b* determines whether the location information substitution data string "NULLAREA" is contained or not in the hyper link character string embedded in the selected menu item. In this case, as shown in FIG. 4A, the hyper link character string is
"http://xxx.co.jp/cgi-bin/
restaurant.cgi?area=NULLAREA", and therefore the determination in step Sa2 is YES, and the process proceeds to step Sa3.

In the case where the location information substitution data string is not contained in the hyper link character string, on the other hand, the process proceeds to step Sa4 to transfer to the process corresponding to the selected menu item, which is not related to the present invention and therefore will not be explained.

In step Sa3, it is determined with reference to the disclosure IP information data base (FIG. 3) whether the IP server 500A constituting the destination of transmission of the location information is the destination to which the location information of the mobile station 101 is disclosed or not. Specifically, it is determined whether the location information disclosure flag of the disclosure IP information data base is set in on state for the host name (URL) in the hyper link character string. In the case under consideration, the location information disclosure flag of the disclosure IP information data base is assumed to be set in on state for the host name "xxx.co.jp", and the process proceeds to step Sa3*a*.

In step Sa3*a*, before the location information is transmitted to the destination IP server 500A to which the location information is to be disclosed, it is determined whether the user permission is required in advance. Specifically, as described above, in the case where the user permit flag of the disclosure IP information data base is set in on state, it indicates that the user permission is required, and the process proceeds to step Sa5. In the case where the user permit flag is set in off state, on the other hand, it is determined that the user permission is not required and the process proceeds to step Sa7.

If the user permit flag is set on, the user permission is required in advance. Therefore, the transmission permit screen for obtaining the user permission to transmit the location information is displayed on the information display unit 110*d* in step Sa5. This is the process performed taking into consideration that the user may not want to transmit the location information even to the IP server 500 registered as a destination to which the location information can be disclosed. In this way, whether the user is willing or not to transmit the location information is confirmed each time the mobile station 101 tries to transmit the location information.

After the key operation of the user to determine whether the user permits the transmission of the location information or not, the process proceeds to step Sa6 to determine whether the transmission of the location information is permitted or not. In the case under consideration, it is assumed that the transmission is permitted by the key operation, and the process proceeds to step Sa7.

In step Sa7, the microcomputer 101*b* receives the radio waves sent from at least three GPS satellites by activating the GPS receiving unit 10*f*. Then, the location measuring program is started thereby to generate the location information of the mobile station 101 based on the radio waves.

Specifically, the radio wave transmitted from each GPS satellite contains the ID information of the GPS satellite and the time at which the particular radio wave is transmitted. The microcomputer 101*b* reads from the timer 101*g* the time point at which the radio wave is received, and from the difference between the time point at which the radio wave is transmitted and the time point at which it is received, calculates the distance from the GPS satellite by which the radio wave is transmitted, to the mobile station 101. This process is performed for each of the radio waves transmitted from at least three GPS satellites so that the distance from each of these GPS satellites to the mobile station 101 is calculated. The location of each GPS satellite is known, and therefore the location at the calculated distance from the location of each GPS satellite is determined as the location information of the mobile station 101.

In this way, we assume that the location information of, say, "N35.43.21.99E141.43.21.99" is generated.

Then, the process proceeds to step Sa8, in which the location information substitution data string "NULLAREA" in the hyper link character string is substituted for by the generated location information "N35.43.21.99E141.43.21.99".

The process proceeds to step Sa9, in which a request signal containing the hyper link character string
"http://xxx.co.jp/cgi-bin/
restaurant.cgi?area=N35.43.21.99E141.43.21.99" is generated, and transmitted to the IP server 500A through the gateway server 330. The IP server 500A starts the location-related information application in response to the request signal thus received, reads, from the location-related information data base 510A, the location-related information (restaurant information) corresponding to the location information "N35.43.21.99E141.43.21.99" contained in the signal and transmits the same location-related information to the mobile station 101 through the Internet 400 based on the mobile station ID contained in the request signal.

In step Sa10, the mobile station 101 receives the location-related information through the gateway server 330, and the microcomputer 101*b* displays the received location-related information on the information display unit 110*d* thereby to end the process.

In the above-mentioned example, on the other hand, we assume that the IP server 500 to which the location information is to be transmitted is not the destination of disclosure of the location information of the mobile station 101. The determination in step Sa3 is NO. Therefore, the process proceeds to step Sa11 so that the transmission of no location information is displayed on the information display unit 101*d* thereby to end the process. Also, in the case where the user indicates by key operation that he/she gives no permission of transmission, the determination in step Sa6 is NO, and therefore the process proceeds to step Sa11, in which the transmission of no location information is displayed on the information display unit 101d thereby to end the process.

A-3: Modification of First Embodiment

The first embodiment can be modified, for example, in the following way:

(1) GPS Variations

According to the first embodiment, it was explained that the timer 101g counts the time points at which the radio waves sent from at least three GPS satellites are received. However, the mobile station 101 is not always required to be equipped with the timer 101g. Specifically, the timer 101g is not required as long as the mobile station 101 receives the radio waves sent out from four GPS satellites, or holds the data indicating the geoid surface, i.e. a curved surface reproducing the ups and downs of the earth surface.

(2) Forms of IP Servers 500A, 500B and so on

According to the first embodiment described above, the IP servers 500A, 500B and so on are connected to the gateway server 330 through the Internet 400. The connection, however, is not necessarily limited to such a form.

The IP servers 500A, 500B and so on may be connected, for example, to the gateway server 330 through a dedicated line or may be arranged in the mobile communication network.

Also, unlike in the first embodiment, the IP servers 500A, 500B and so on are not necessarily required to have the function to supply some information to the mobile station 101, but they may be a simple computer, or a portable telephone which can be movably carried or a PDA with communication and self-location measuring functions.

(3) Form of Location Information Substitution Data String or Mobile Station ID Substitution Data String In the first embodiment described above, the location information substitution data string "NULLAREA" is added to the last part of the hyper link character string contained in the request signal. This is not always necessary, but the substitution data string can be contained at a predetermined location in the request signal transmitted from the mobile station 101. Also, the data string is not necessarily the character string such as "NULLAREA" or "NULLID", but other character strings.

(4) Description Format of Location Information

In the first embodiment described above, by converting predetermined character string into location information, the particular location in formation can be supplied to various IP servers.

The invention, however, is not limited to this, but it is only necessary that the description format of the location information is coincident between the mobile station 101 and the IP servers 500A, 500B and so on. Specifically, the IP servers 500A, 500B and so on notify the description format of the location information to the mobile station 101 in advance, so that the location information is described by the mobile station 101 based on the notified format, and transmitted to the IP servers 500A, 500B and so on.

The processing for notification of the description format of the location information described above includes the following, for example. First, the IP servers 500A, 500B and so on describe the description format of the location information in a predetermined file, and transmit it to the mobile station 101 with a specific extension indicating that the file is for designating the description format of the location information. The mobile station 101 acquires the description format of the location information with reference to the contents of the file.

(5) Form of Mobile Station 101

According to the first embodiment described above, the mobile stations such as the portable telephone and PHS are used as a mobile station. The invention is not limited to them, however, but may use such a mobile communication terminal as the PDA having the function of communication and self-location measurement as long as it has the function of radio communication of data with the base station 210 of a mobile communication network.

(6) Data description language

According to the first embodiment described above, the data transmitted and received between the gateway server 330 or the servers 500A, 500B and soon and the mobile station 101 are of HTML format. The invention is not limited to it, however, but other description languages such as XML (Extensible Markup Language) are also applicable.

(7) Type of Information Notified to IP Servers 500A, 500B and so on

According to the first embodiment described above, only the location information is supplied to the IP servers 500A, 500B and so on. The invention is not limited to it, however, but such information as the location information acquisition time and the user state (moving, meeting or staying in home, etc.) may be attached to the information and notified to the IP servers 500A, 500B and so on.

For this purpose, the IP servers 500A, 500B and so on wanting to acquire the location information acquisition time and the user state in addition to the location information make sure that the hyper link character string to be transmitted to the user mobile station 101 contains the data string to be converted to such information.

For example, the hyperlink character string can be described in the following manner.

"http://xxx.co.jp/cgi-bin/
posi.cgi?area=NULLAREA&time=NULLTIME&state=NULLSTAT E"

where "NULLAREA", "NULLTIME" and "NULLSTATE" are the character strings to be substituted for by the location information, the location information acquisition time and the user state, respectively. Hereinafter, "NULLTIME" will be referred to as "the location information acquisition time substitution data string" and "NULLSTATE" "the user state substitution data string".

The "user state" can be designated by either of two methods, one by determining the user state based on the location of the mobile station 101 indicated by the location information generated by itself and substituting the user state for the character string "NULLSTATE" automatically, and the other by causing the user of the mobile station 101 to select the present state of the user from a predetermined menu by input operation in the mobile station 101 and substituting the selected information for the character string "NULLSTATE".

More specifically, according to the first method, upon detection of the location information substitution data string "NULLAREA" and the location information acquisition time substitution data string "NULLTIME" from the hyper link character string received by the mobile station 101, the microcomputer 101b measures the location of itself by executing the program for measuring the location of itself according to a method similar to that for the embodiment described above. The resulting location information and the location measuring time information are substituted for the character strings of "NULLAREA" and "NULLTIME", respectively. The procedure up to this point is the same as that up to step Sa8 shown in FIG. 7.

After that, the microcomputer 110b of the mobile station 101 determines whether the user state substitution data string "NULLSTATE" is contained in the hyper link character string received.

In the case where this determination is YES, the microcomputer 110b accesses the location information data base as shown in FIG. 8A. This location information data base has stored therein a table describing the location information specified by the latitude (x), the longitude (y) and the altitude (Z) and the corresponding information representing the artificial objects or natural objects occupying the respective locations (hereinafter referred to as the occupant information). The occupant information includes the category and the name of the occupant and is stored in terms of "category/occupant name" such as "Expressway/Tomei Expressway", "Shopping/xxx Tower Shopping Floor" and "Restaurant/xxx Tower Restaurant".

Figure 8B:
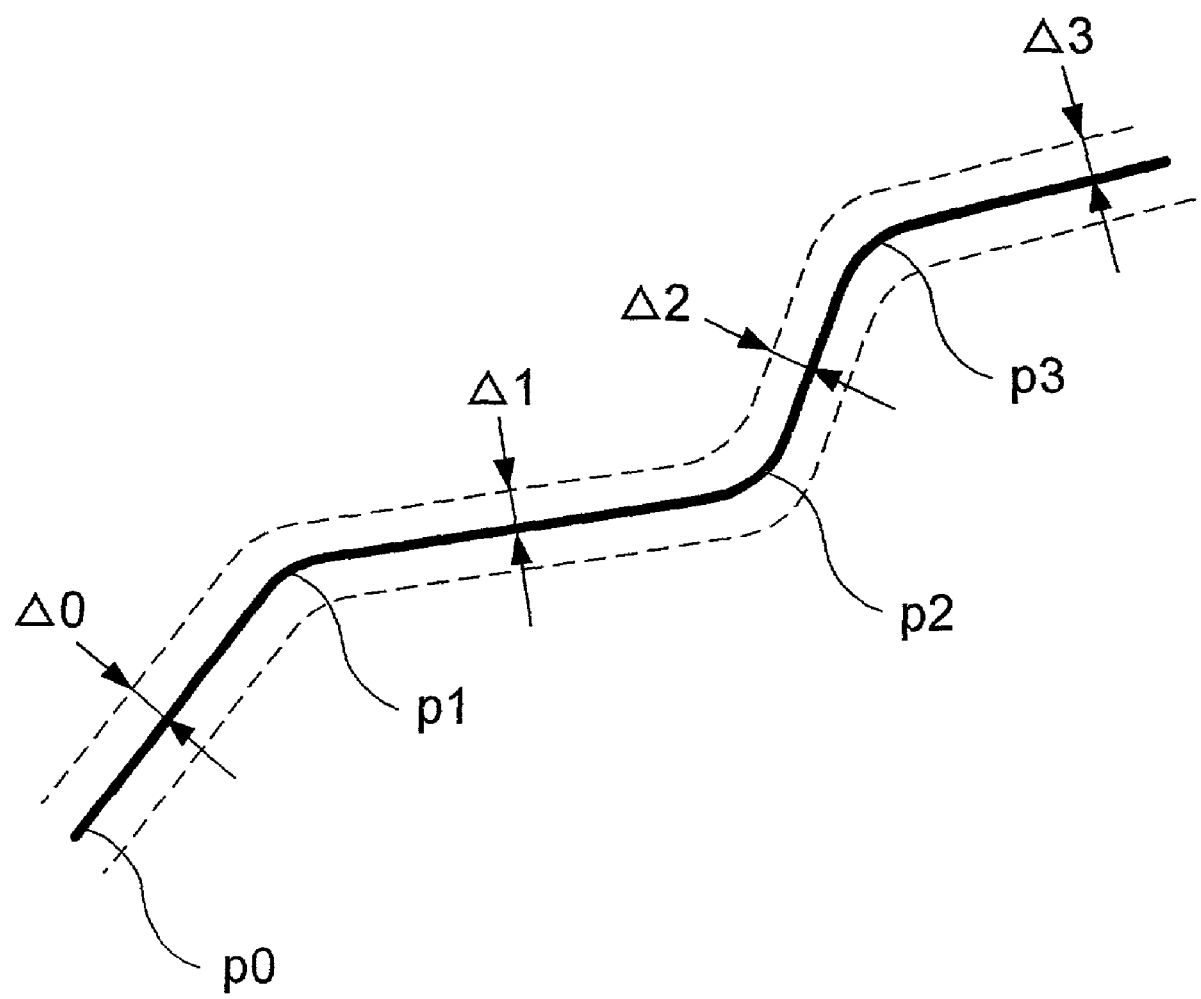
FIG. 8B is a diagram showing the linear information indicating a road shown in FIG. 8A according to the first embodiment.

The location information is expressed in either of two forms. The first form of expression is a combination of linear information and allowance. The location information based on the first form of expression is used for specifying the location of an area occupied by an artificial object such as a road or railroad which extends in curved form in the space. With reference to FIG. 8B, the first form of expression will be explained. In FIG. 8B, the spatial curve plotted by the central portion of a given road is segmented into a plurality of straight lines p0-p1, p1-p2, p2-p3 and so on. As shown in FIG. 8A, the location information corresponding to the road includes the linear information corresponding to each of the straight lines p0-p1, p1-p2, p2-p3 and so on. Each linear information is expressed by the three-dimensional coordinate values (latitude x, longitude y and altitude z) of the two ends (point p0 and point p1 of straight line p0-p1, for example) of a straight line corresponding to the particular linear information. Also, as illustrated in FIG. 8B, each section of the road has a transverse expansion such as Δ0 for the section of the road corresponding to the straight line p0-p1, Δ1 for the section corresponding to the straight line p1-p2, and so on. A person, if located within the range of the transverse expansion from the central portion of the road, can be said to be located on the particular road. As shown in FIG. 8A, the location information corresponding to the road contains an allowance for each section of the straight lines p0-p1, p1-p2, p2-p3 and so on, and each allowance represents the transverse expansion (displacement from the center) of a corresponding road section. The mobile station 101, once the threel-dimensional coordinate values (latitude x, longitude y and altitude z) of the present location thereof is obtained, refers to a set of a plurality of linear information and allowances corresponding to the road and can determine whether the mobile station 101 is located in the space expressed by the information set, i.e. on the particular road.

The second form of expression is a combination of spot information and the allowance. The location information based on the second form of expression is used for specifying the location of an occupied area such as a building or a floor in the building. The location information based on the second form of expression includes the spot information indicating a representative point of the floor and an allowance indicating the expansion of the floor from the representative point as a center. For example, a building and a plurality of floors in the building are plotted in FIG. 8C. In this case, the location information corresponding to each floor, as shown in FIG. 8A, includes the spot information indicating the three-dimensional coordinate values (latitude x, longitude y and altitude z) of the representative points q0, q1 and so on of each floor and the allowance indicating the expansion from the representative point of each floor (for example, r0, r1 and so on, in FIG. 8C). The mobile station 101, once the three-dimensional coordinate values (latitude x, longitude y and altitude z) of the present location are obtained, accesses the set of a plurality of spot information corresponding to the respective floors and the allowances and can determine whether the mobile station 101 is located in any one of the floors indicated by the information set.

In some cases, however, the three-dimensional coordinate values cannot be obtained but the two-dimensional values not including the altitude may be obtained as the present location. The location data base shown in FIG. 8A presupposes such a case and has the location information for the whole building.

Figures 8C, 8D:
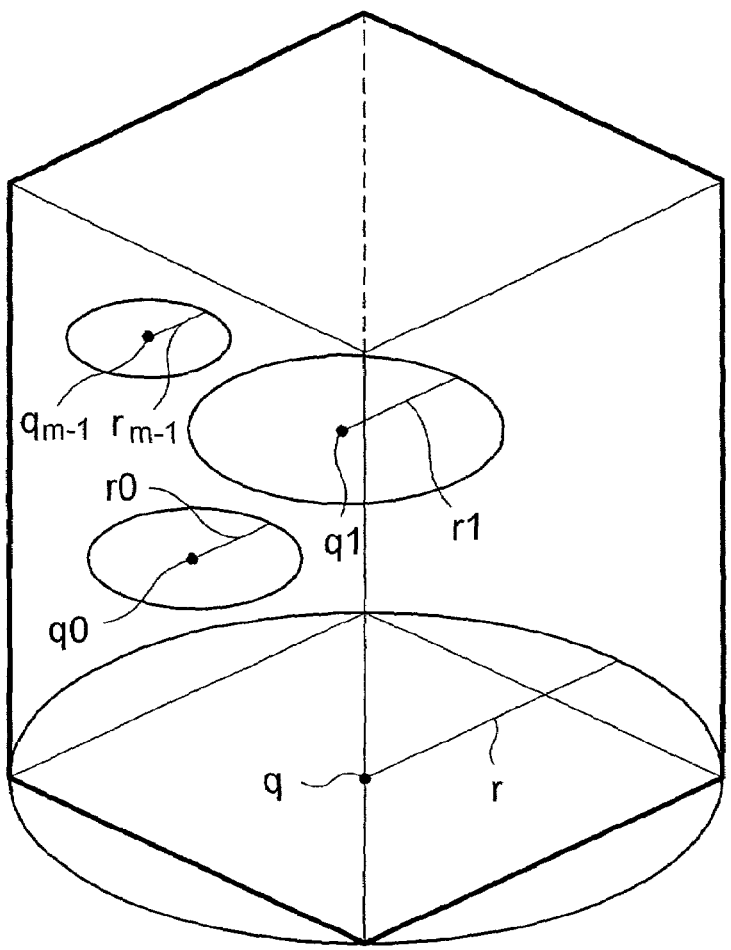
FIG. 8C is a diagram showing the spot information indicating the floors in a building shown in FIG. 8A according to the first embodiment.
FIG. 8D is a diagram showing a data format of a table included in a mobile station according to the first embodiment.

Further, the mobile station 101 has a user state substitution table in store as shown in FIG. 8D. This table contains categories and corresponding user states, respectively. The mobile station 101, when determining a category of the occupant information from the present location thereof, determines the character string indicating the corresponding user state from this user state substitution table. Specifically, we assume that the present location of the mobile station 101 is "location (latitude x, longitude y and altitude z)". Also, we assume that the microcomputer 101b searches the location information database (FIG. 8A) for the location information with the "location (latitude x, longitude y and altitude z)" thereof which falls into the allowance, and that the location information "line p0-p1" has been specified. From FIG. 8A, the occupant information for "line p0-p1" is "expressway/Tomei", and therefore by referring to the table of FIG. 8B, the category "expressway" of the occupant information is converted to the user state "MOVING".

In the case where "NULLSTATE" is not contained in the hyper link character string received, on the other hand, only the required information other than "user state", which in this case are the location information and the location information acquisition time information, are transmitted to the IP servers 500A, 500B and so on.

In the second method of designating the "user state", the mobile station 101 detects the "user state" by receiving the present state of itself, by a key operation by its user, and substitutes the information thus obtained for the character string "NULLSTATE".

Figures 9, 10:
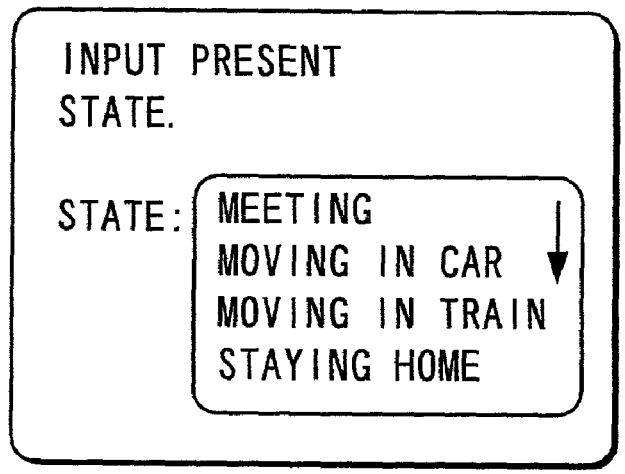
FIG. 9 is a diagram showing a screen displayed on a mobile station according to a modification of the first embodiment.
FIG. 10 is a diagram showing a data format of a data base included in a node of a network according to a modification of the first embodiment.

First, as in the first method described above, the microcomputer 101b determines whether the user state substitution data string "NULLSTATE" is contained in the received character string or not. In the case where the determination is YES, the screen for prompting the user to set the present state is displayed on the information display unit 101d as shown in FIG. 9. The items under the title "state" include "meeting", "moving in car", "moving in train" and "in home". These items are displayed in a different order for a different frequency of selection, the item of the highest frequency of selection being displayed at the top. The user of the mobile station 101 selects and inputs the desired item by key operation through the operation unit 101e by reference to FIG. 9.

Assume, for example, that the user has selected the item "moving in car". The microcomputer 101b that has received this information generates the data character string "MOVING" to be substituted for the user state substitution data string "NULLSTATE".

In this way, the information indicating the "user state" thus generated is substituted for "NULLSTATE", so that the up data string described below is transmitted to the IP servers 500A, 500B and so on.

"http://xxx.co.jp/cgi-bin/
  posi.cgi?area=N35.716931E141.722775&time=
  20010208153344.5+0900&state=MOVING", where
"N35.716931E141.722775" is the data indicating the location of the mobile station 101, "20010208153344.5+0900" the data indicating the location information acquisition time, and "MOVING" the data indicating the user state.

In this second method, the user is prompted to input information after the mobile station 101 detects the character string "NULLSTATE". Nevertheless, the user can alternatively set the state in advance. Also in such a case, by the same method as described above, the user can select the state on the screen of the mobile station 101. According to this method in which the "user state" is input in advance, the input operation is performed before the notification requesting the acquisition of information from the computer is transmitted to the mobile station 101, and therefore the burden on the user performing the input operation is reduced while at the same time shortening the time required for sending information in response.

With a configuration of the mobile station 101 having neither the information display unit 101d nor the operation unit 101e, on the other hand, the mobile station 101 can be connected to a personal computer or the like arbitrary terminal from which the state of the mobile station 101 can be written in the memory (not shown) of the mobile station 101.

In this case, when the mobile station 101 receives the hyper link character string containing the character string "NULLSTATE", the user state generated in advance is substituted for "NULLSTATE".

By the method described above, the IP servers 500A, 500B and so on can acquire not only the location information but also the location information acquisition time and the user state at the same time.

(8) Form of Place for Storing Information on Destination of Disclosure and Form of Information According to the first embodiment, the information on whether the IP server of the destination of disclosure is involved or not is stored in the memory of the mobile station 101. This information may alternatively be stored in another node in the network and accessed by the mobile station 101 to refer to the information each time a request is received to disclose the location information. As a result, the burden on the memory of the mobile station 101 is reduced, and the deterioration of performance of the multifunctional mobile communication terminal can be prevented to allow the execution of various programs within a limited memory.

Another node in the network may be a relay center such as a gateway server 330 or a server managed by the company providing a service for privacy protection such as a security firm. Also, a single node or a plurality of nodes may be involved, and the mobile station 101 can register the destination information at an arbitrary place desired by itself.

As a precondition, the mobile station 101 is to register, in advance, the information of the destination to which the location information of itself is disclosed, by accessing the nodes or by a method in which the carrier of the mobile communication network is notified and, based on the notification, registers the name of the IP server to be disclosed, in the data base at a predetermined place.

The registered information on the destination of disclosure can take such a form as to set, for each mobile station 101, the IP servers 500A, 500B and so on to which the location information is to be disclosed. FIG. 10 shows an example of a data format of the data base included in a node. As shown in FIG. 10, the "IP server name" to which the location information is to be disclosed is registered in the data base for each "mobile station ID". The location information of the mobile station ID "MS0901111111" shown in FIG. 10, for example, is permitted to be disclosed to the "IP servers 500A, 500B, 500H, and so on". It is determined that the location information is not disclosed to the IP servers 500 not registered in this data base.

The location information of a specific mobile station 101 can be set not to be disclosed. FIG. 11 shows an example of a data format of the data base included in a node in a network in such a case.

The information to be disclosed can take an arbitrary different form for a different node in which the information on the destination of disclosure is stored.

As described above, according to this method, the information on the destination of disclosure can be stored by the user in an arbitrary node in the network. At the same time, in the node for storing the information on the destination of disclosure, the information on the destination of disclosure can be stored in a form which meets various needs of the user who wants the location information to be known to a specific IP server 500 only or who never wants the location information to be known to any server. Thus, the safety and convenience are improved for providing the location information of the user of the mobile station 101.

(9) Transmission of Location Information, etc. to a Plurality of IP Servers 500A, 500B and so on According to the first embodiment described above, the location information or the like is transmitted to a single IP server 500. The location information or the like, however, may be notified not necessarily to a single destination but to a plurality of IP servers 500A, 500B and so on.

We assume that the IP server 500A coordinates the acquisition of the location information for a plurality of destinations of notification (which are assumed to be IP servers 500A, 500B, and 500C, in this case).

First, the IP server 500A generates, in advance, the following down data designating a plurality of destinations of notification to which the location information is to be transmitted, and transmits the data to the mobile station 101:

"http://xxx.co.jp/cgi-bin/
  manager.cgi?area=NULLAREA&time=NULLTIME&
  state=NULLSTATE&HOST1=http://aaa.co.jp/cgi-bin/
  posi.cgi?area=NULLAREA&HOST2=http://bbb.co.jp/
  cgi-bin/posi.cgi?area=NULLAREA&time=
  NULLTIME".

The microcomputer 101b of the mobile station 101 that has received this data string recognizes, from a predetermined key word, i.e. the character string "HOST", that a plurality of destinations of notification are included in the data string and divides the data character string before (or after) the key word "HOST" by the destination of notification.

As a result, the data character string received by the mobile station 101 is divided into three parts including the data string corresponding to the IP server 500A, i.e.

"http://xxx.co.jp/cgi-bin/
  manager.cgi?area=NULLAREA&time=NULLTIME&
  state=NULLSTATE";
the data string corresponding to the IP server 500B, i.e.
  "http://aaa.co.jp/cgi-bin/posi.cgi?area=NULLAREA";
  and
the data string corresponding to the IP server 500C, i.e.
  "http://bbb.co.jp/cgibin/posi.cgi?area=NULLAREA&
  time=NULLTIME".

Then, the mobile station 101, after performing the operation for acquiring the location information as explained in the first embodiment, substitutes the data such as the location information, the location information acquisition time and the user state as of the time of acquisition, respectively, for the character strings "NULLAREA", "NULLTIME" and "NULLSTATE" contained in each data string. An example of the data after substitution is as follows:

a) Data string transmitted to IP server 500A
"http://xxx.co.jp/cgi-bin/
manager.cgi?area=N35.716931E141.722775&time=
2001020 8153344&state=MEETING"

b) Data string transmitted to IP server 500B
"http://aaa.co.jp/cgi-bin/
posi.cgi?area=N35.716931E141.722775"

c) Data string transmitted to IP server 500C
"http://bbb.co.jp/cgi-bin/
posi.cgi?area=N35.716931E141.722775&time=
2001020815 3344"

The mobile station 101 transmits these up data strings independently of each other to the computers of different destinations, and thereby can provide the required information such as the location-related information to a plurality of destinations of notification.

Also, by use of this method of notification to a plurality of destinations, the location of the user of the mobile station 101 can be notified not only to a plurality of IP servers but to a plurality of mobile or stationary terminals. This is useful, for example, in the case where an entertainment idol supplies his/her present location information to the (mobile or stationary) terminals held by a plurality of the members of his/her fan club, using the mobile station 101.

In such an application as mentioned above for providing the members of a fan club with the information, however, the destinations of notification are often too many, and therefore the problem may be posed that the requirement cannot be met by the method described above in which the destinations of notification are designated by including a plurality of destinations of notifications in the hyper link character string.

In view of this, a method has been made available in which a group of destinations of notification are designated by those acquiring the location information, using a program for managing the telephone numbers of the destinations of communication by group, i.e. a telephone directory, such as is normally installed at a mobile communication terminal.

This method will be explained below taking as an example the case in which the present location information of an entertainment idol is transmitted to the terminals of the members of his/her fan clubs. First, the telephone numbers of destinations of notification are registered by group in the form shown in FIG. 12A in the memory (not shown) of the mobile station 101 of the entertainment idol who provides the location information. As shown in the drawing, a multiplicity of destinations of notification are registered in groups 00 to n. Each group corresponds to a fan club. Group 01, for example, includes the information on destinations of notification such as the telephone numbers, mail addresses, fax numbers and home addresses of the terminals B, C and D of the fans belonging to a given fan club.

The mobile station 101, upon receipt of a request from another terminal for transmission of the present location information, transmits the present location information to each destination of notification belonging to the group designated by the particular request. According to this embodiment, however, as shown in FIG. 12B, a table specifying, by group, parties from whom the transmission request is received for actual transmission of the present location information is stored in the mobile station 101, which determines, based on the table, whether a given transmission request is to be accepted or not.

This method will be described in more detail. First, we assume that a person associated with a fan club corresponding to group 01 desires to receive the distribution of the location information of an idol. The terminal A of the person transmits to the mobile station 101 a hyper link character string containing the data string designating an arbitrary group to be notified, thereby requesting that the location information of the mobile station 101 be transmitted to the addresses (terminals B, C and D, for example) belonging to the designated group 01 to be notified.

In this case, the terminal A can transmit the following hyper link character string to the mobile station 101 of the idol:

"<IMG SRC="cti-pos://---.sposi/posi.cgi?req= 09012345679&group=01&area=NULLAREA &state= NULLSTATE>"

where the group number 01 to be notified is designated by the character string "group=01". Also, "req=09012345679" indicates the telephone number of the terminal A as an ID code of the terminal A requesting the transmission of the location information. This ID code is not necessarily the telephone number but may be a mail address, a fax number or the information such as a home address contained in the telephone directory by which the terminal A can be identified.

The microcomputer 101*b* of the mobile station 101 of the idol that has received this hyper link character string first identifies the transmitter terminal based on the ID code described above. In the case under consideration, it is assumed that the terminal A has been identified by referring to the telephone directory stored in the memory based on the telephone number "09012345679". In the case where the mobile station 101 cannot identify the transmitter terminal, i.e. in the case where the request to notify the location information is from a terminal not registered in the telephone directory of the mobile station 101, then the processing in the mobile station 101 is terminated at this point.

Then, the microcomputer 110*b* of the mobile station 101 determines, by referring to the "destination group accessibility table" (FIG. 12B) stored in the memory, whether the terminal A can utilize the destination data of "communication destination group 01" or not.

The "destination group accessibility table", as shown in FIG. 12B, has registered therein, by destination group, whether each terminal can access the destination information of the particular group or not. This table shows that the terminal A can access the data of the destination group 01.

In the case where the transmitter is the terminal E, on the other hand, the data of the group 01 is not accessible. In such a case, a notice disapproving the communication may be transmitted by returning directly, without substitution, the data string transmitted from the terminal E.

Again, we assume that the transmitter terminal is the terminal A. The mobile station 101 of the idol, after substituting the requested data such as the location information, first transmits the substituted data string to the terminal A.

"<IMG SRC="cti-pos://---.sposi/posi.cgi?req= 09012345679&group=01&area=N35.7169 31E141.722775&state=ONAIR-TBS>"

After transmitting this data string, the mobile station 101, by-referring to the destination list (FIG. 12A) of group 01 stored beforehand, retrieves the data on the destination secondary to the primary destination in the list, i.e. the mail address of the terminal B in the case under consideration. Then, the data string to be sent to the terminal B is generated.

An example of the data string transmitted to the terminal B is as follows:

"<IMG SRC="cti-pos://---.sposi/posi.cgi?type=U&subject=ONAIR-TBS&address=09012345678@aaa.com&body=http://mapserv.map fan.com/cgi-bin/map/mapserv.cgi?MAP=E141.722775N35.71693&ZM=9&SZ=12 0,120&OPT=30500011&P=eE141.722775N35.716931">"

By this method, the mobile station 101 acquires the secondary destinations of the terminals of all the primary destinations registered in the destination list of the destination group 01, and can transmit the location information of the mobile station 101 continuously to each of the secondary destinations.

This method of designating the destination group utilizing the function of the telephone directory, as compared with the method of designating destinations by listing a multiplicity of destinations in a single character string, makes it possible to request the transmission of the location information to a multiplicity of destinations without excessively increasing the traffic while at the same time reducing the communication cost.

(10) Transmission of Location Information, etc. at Regular Time Intervals

In the first embodiment described above, the information requested are transmitted to the IP servers 500A, 500B and so on, only once at the time of receiving the hyper link character string requesting the transmission of the location information, etc. As an alternative, the mobile station 101 may acquire and transmit the location information, etc. to the IP servers 500A, 500B and so on, at regular time intervals.

In the case where the IP servers 500A, 500B and so on are desirous of acquiring the information such as the location information, the location information acquisition time and the user state at regular time intervals, such as in the case where they are desirous of tracking a moving object in a bus operation control, for example, the mobile station 101 can be instructed to acquire and transmit the location information, etc. at regular time intervals by transmitting a hyper link character string designating a regular notice to the mobile station 101 from the IP servers 500A, 500B and so on.

In such a case, the character string "cycle=X" (X: value of acquisition interval time) for designating the intervals of the acquisition time and the character string "start=Y&end=Z" (where Y is the acquisition start time, and Z the acquisition end time) for designating the acquisition start time and the acquisition end time are added to the hyper link character string to be transmitted to the mobile station 101 from the IP servers 500A, 500B and so on, in the following manner:

"http://xxx.co.jp/cgi-bin/posi.cgi?cycle=10&start=080000&end=170000&area=NULLAREA&time=NULLTIME&state=NULLSTATE".

The mobile station 101 that has received this character string is instructed to acquire the location information of itself, the location information acquisition time and the state of itself every ten seconds during the time from 8 o'clock to 17 o'clock, and each time the information is acquired, transmit it to the IP servers 500A, 500B and so on.

As an alternative, the mobile station 101, without transmitting the information acquired at regular time intervals directly, can be instructed to store them in the mobile station 101 and transmit them collectively at a designated time point. In that case, the hyper link character string is as follows:

"http://xxx.co.jp/cgi-bin/posi.cgi?cycle=10&interval=1h&start=080000&end=1700 00&area=NULLAREA&time=NULLTIME"

where by adding the character string "interval=1h", an instruction is given to transmit, every hour, the information acquired every ten seconds, during the period from 8 o'clock to 17 o'clock.

The mobile station 101 that has received any of the hyper link character strings described above is set to return the requested information at the timing requested by the IP servers 500A, 500B and so on.

In this case, in compliance with the request indicated by the character string described above, the location information acquired every ten seconds is stored temporarily in the memory in the mobile station 101. The location information data in a plurality of time series thus stored and the location information acquisition time thereof are transmitted collectively one hour later to the destination IP servers. Specifically, a method is available in which the substituted character strings "http://xxx.co.jp/cgi-bin/posi.cgi?area=N35.716931E141.722775&time=20010208153344" in the same number as stored are transmitted in a row. According to this method, a plurality of sets of the location information data and the location information acquisition time data acquired during one hour are all transmitted with the character string "http://xxx.co.jp/cgi-bin/posi.cgi?" attached at the head thereof.

A second method is such that the character string

"http://xxx.co.jp/cgi-bin/posi.cgi?" is used only once for the first set of the location information data and the location information acquisition time data, and the remaining data are continuously described and sent immediately following the first set. According to the second transmission method, an example of a specific transmission character string is as follows:

"http://xxx.co.jp/cgi-bin/posi.cgi?area=N35.716931E141.722775&time=20010208153344&area=N35.716931E141.723800&time=20010208153354&area=N35.716931E141.724800&time=20010208153404& . . . ."

Also, by use of the method of notifying the location information to a plurality of destinations described above in the modification (9), a request can be made to notify a plurality of destinations of the location information at regular time intervals.

In such a case, the IP server 500A for coordinating the correlated computers transmits the following hyper link character string to the mobile station 101:

"http://aaa.co.jp/cgi-bin/manager.cgi?cycle=1&area=NULLAREA&time=NULLTIME&state=NULLSTATE&HOST1=http://bbb.co.jp/cgi-bin/posi.cgi?cycle=10&area=NULLAREA&HOST2=http://ccc.co. jp/cgi-bin/map.cgi?cycle=60&area=NULLAREA&time=NULLTIME"

In this case, the mobile station 101 is requested to notify the location information of itself, the location information acquisition time and the user state every second to "aaa.co.jp" (assumed to be the URL of the IP server 500A)

In similar fashion, "bbb.co.jp" (assumed to be the URL of the IP server 500B) is notified of the location information every ten seconds, and "ccc.co.jp" (assumed to be the URL of the IP server 500C) is notified of the location information and the location information acquisition time every 60 seconds.

In response, the mobile station 101 acquires the information including the location information of itself, the location information acquisition time and the user state by the method described above, and then substitutes the substituted data string for each of the information. The up data string generated as the result is transmitted to designated destinations at designated time intervals.

The return up data string to the received data string is as follows:

"http://aaa.co.jp/cgi-bin/
manager.cgi?cycle=1&area=N35.716931E141.722775&
time=20010208153344.5&state=MEETING" for every second;

"http://bbb.co.jp/cgi-bin/
posi.cgi?cycle=10&area=N35.716931E141.722775" for every ten seconds; and "http://ccc.co.jp/cgi-bin/map.cgi?cycle=60&area=N35.716931E141.722775&
time=NU LLTIME20010208153344.5" for every 60 seconds.

This method makes it possible to transmit the location information of the mobile station 101 to one or a plurality of destinations at regular time intervals.

(11) Operation of Mobile Station 101 when Location Information is not Disclosed

According to the first embodiment described above, in the case where the computer constituting a data transmitter (assumed to be the IP server 500A in this case) is not the destination to which the location information is to be disclosed or in the case where the user of the mobile station 101 rejects the transmission of the location information, the absence of transmission of the location information is displayed on the information display unit 101d of the mobile station 101 in step Sa11 shown in FIG. 7 thereby to end the process. As an alternative, a location information transmission rejection notice indicating the rejection of transmission of the location information may be transmitted to the IP server 500A in step Sa13 before ending the process.

This location information transmission rejection notice can be carried out by returning the information such as the location information requested by the IP server 500A without any substitution in the received data string.

Assume, for example, that the mobile station 101 has received the received data string "http://xxx.co.jp/cgibin/
restaurant.cgi?area=NULLAREA&time=NULLTIME&
state=NULLSTATE".

Normally, the character strings such as "NULLAREA", "NULLTIME" and "NULLSTATE" are returned to the disclosure destination IP servers by being substituted for by the information such as the location information, the location information acquisition time and the state as of the time of acquisition. In the case where the disclosure is rejected, however, the rejection is displayed by "not substituting" these data strings. That is to say, the data string transmitted from the mobile station 101 to the IP server 500A is expressed as "http://xxx.co.jp/cgi-bin/
restaurant.cgi?area=NULLAREA&time=NULLTIME&
state=NU LLSTATE".

The IP server 500A, by receiving this data string "not substituted", recognizes that the acquisition of the location information of the mobile station 101 has been rejected.

Also, by receiving this transmission rejection notice, the IP server 500A can discriminate the case in which no data is returned from the mobile station 101, for example, the case in which the mobile station 101 is located outside the communication range and the connection with it cannot be established.

As another alternative, in the case where the location information cannot be transmitted, the mobile station 101 may substitute a predetermined key word meaning that the transmission is impossible (hereinafter referred to as the error key word) for the location information substitution data string "NULLAREA" and transmit it to the IP servers 500A, 500B and so on.

B: SECOND EMBODIMENT

Now, a second embodiment of the invention will be explained.

According to this second embodiment, unlike in the first embodiment, the location information is not generated by the mobile station 101 alone, but in collaboration between the mobile station 101 and a predetermined node in the mobile communication network.

Specifically, the mobile station 101, upon receipt of the radio waves sent out from GPS satellites, transfers the information contained in the radio waves, i.e. the identification (ID) information of the GPS satellites and the time at which the radio waves are sent out, plus the time at which the radio waves are received, to a predetermined node in the mobile communication network. The information including the ID information of the GPS satellites, the time at which the radio waves are sent out and the time at which the radio waves are received will hereinafter be collectively referred to as the GPS information. Instead of the time at which the radio waves are sent out and the time at which the radio waves are received, however, the difference between these two time points can be used.

The predetermined node in the network, on the other hand, calculates the location information based on the GPS information received from the mobile station 101. The location measuring means in which the mobile station 101 only receives the radio waves sent out from the GPS satellites and the location information is calculated by a node in the network in this way is hereinafter referred to as the network-type GPS.

The node may be any of the devices including the base station 210, the switching station 220 and the gateway server 330 arranged in the network. In the second embodiment, however, an explanation will be given of the case using the gateway server 330.

Figure 13:
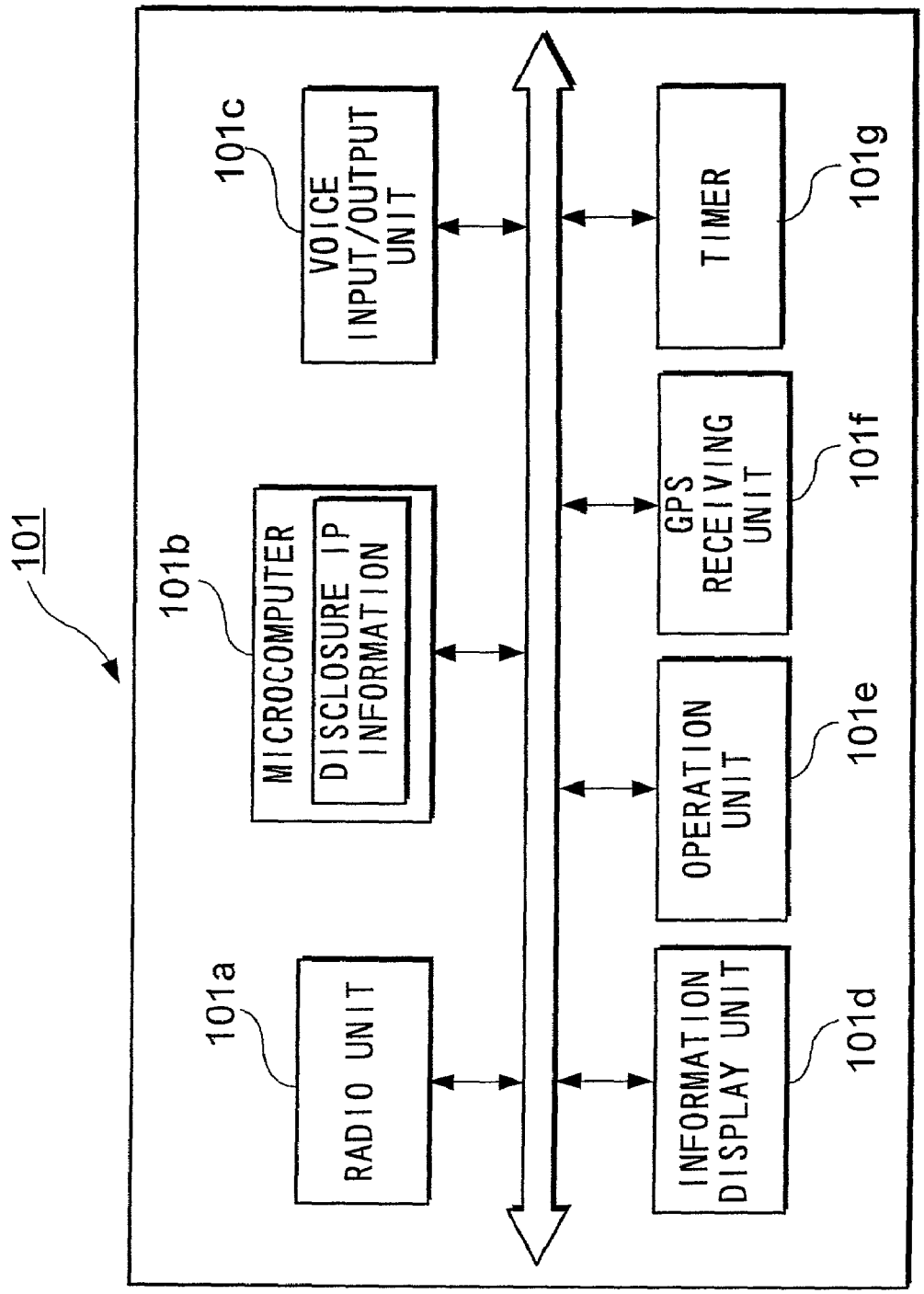
FIG. 13 is a block diagram showing a configuration of a mobile station according to a second embodiment of the invention.

FIG. 13 is a block diagram showing a configuration of the mobile station 101 according to the second embodiment. In this diagram, the component elements shared by the first embodiment shown in FIG. 2 are designated by the same reference numerals, respectively, and will not be explained.

The difference of this mobile station 101 from that of the first embodiment is that the microcomputer 101b has no location measuring program for calculating the location information. This is by reason of the fact that the location information is calculated in the network as described above.

Figure 14:
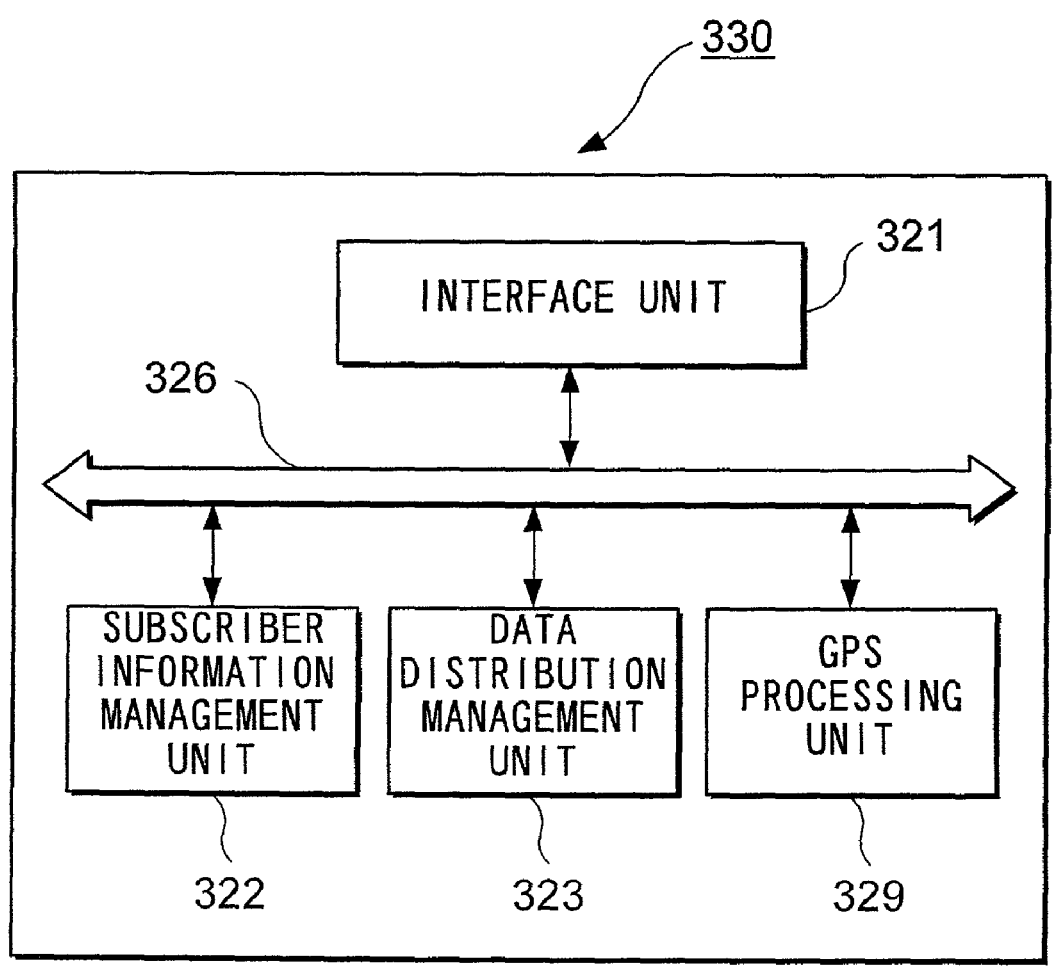
FIG. 14 is a block diagram showing a configuration of a gateway server according to the second embodiment.

FIG. 14 is a block diagram showing a configuration of the gateway server 330 according to the second embodiment. In this diagram, the component elements shared by the first embodiment shown in FIG. 5 are designated by the same reference numerals, respectively, and will not be described.

The difference of the gateway server 330 from that of the first embodiment is that it has a GPS processing unit 329 for calculating the location information based on the GPS information transmitted from the mobile station 101.

Now, with reference to FIG. 15, the operation of the second embodiment will be explained.

The flow shown in this diagram is different from that of the first embodiment shown in FIG. 7 in that steps Sb7 to Sb9 are executed in place of step Sa7.

Specifically, in step Sb7, the microcomputer 110b of the mobile station 101 receives the radio waves sent out from the GPS satellites by activating the GPS receiving unit 101f.

Then, in step Sb8, the ID information of the GPS satellites and the time points at which the radio waves are sent out are extracted from the radio waves received, and the GPS information including the extracted information and the time points at which the radio waves are received are transmitted to the gateway server 330. The GPS processing unit 329 of the gateway server 330, on the other hand, calculates the location information based on the GPS information transmitted from the mobile station 101 and transmits it to the mobile station 101.

In step Sb9, the microcomputer 101b of the mobile station 101 receives the location information transmitted from the gateway server 330.

The other steps are shared by the first embodiment described above and will not be explained.

According to this second embodiment, the mobile station 101 may have only the function of receiving the radio waves sent from the GPS satellites, and is not required to execute the process for calculating the location information based on the information contained in the radio waves. In other words, the processing burden on the mobile station 101 is reduced so that the power consumption is expected to decrease while at the same time reducing the size and weight.

B-1: Modifications of Second Embodiment (1) Variation of Location Measuring Means The means for measuring the location in collaboration between the mobile station 101 and the gateway server 330 is not limited to the network-type GPS used in the second embodiment.

For example, the location information may be generated by the mobile station 101 using the GPS, and this location information may be corrected by a predetermined node in the network using the D(Differential)-GPS. Specifically, the base station 210, the switching station 220 or the gateway server 330 may include a GPS correcting unit (not shown) for correcting the GPS measurement of the mobile station 101 by the D-GPS. This GPS correcting unit corrects the GPS-measured value of the mobile station 101 based on the GPS measurement error of itself. The GPS measurement thus corrected is transmitted to the mobile station 101. By making correction by the D-GPS in this way, the accuracy of the location information is improved.

Also, not only a node in the network but the mobile station 101 itself may have this function of correction by the D-GPS. For example, a D-GPS correction value valid for each of predetermined areas is announced in the predetermined area through the radio channel of the mobile communication network or the FM broadcasting, and the mobile station 101 receives the correction value to correct the GPS measurement.

The location measurement using the base station ID of the mobile communication network as described in the third embodiment later can also be considered as a means for measuring the location in collaboration between the mobile station 101 and the gateway server 330. Thus, such a location measuring means is applicable to the second embodiment.

(2) Also in this second embodiment, what is described wit-h reference to the modifications of the first embodiment above is applicable. Specifically, the modifications (2) to (11) of the first embodiment are applicable.

C: THIRD EMBODIMENT

Now, a third embodiment of the present invention will be explained.

According to the third embodiment, the location information can be measured in any one of a plurality of different measuring method. Among these measuring methods, the location is measured and the location information is generated by using the method designated by the IP server 500.

In the case under consideration, it is possible to perform the location measurement based on a unit of base station 210 of the mobile communication network in addition to the measurement by network-type GPS. Which of the location measuring means is to be employed is designated by the information added to the hyper link character string corresponding to a menu item.

FIG. 16 is a diagram showing an example of a hyper link character string embedded in a menu item.

As shown in the drawing, a character string ".gps" or ".bs" indicating the location measuring method for the location information is added to the tail of the location information substitution data string "NULLAREA". The character string ".gps" means the location measuring method called the network-type GPS and the character string ".bs" means the location measuring method using the base station ID. The mobile station 101, upon detection of the location information substitution data string from the hyper link character string embedded in the menu item selected by the user, determines the location measuring method to be executed, by referring to the character string ".gps" or ".bs" added to the data string.

The mobile station 101 according to the third embodiment is different from that of the second embodiment in that the microcomputer 101b is equipped with a program for performing the operation described later.

Figure 17:
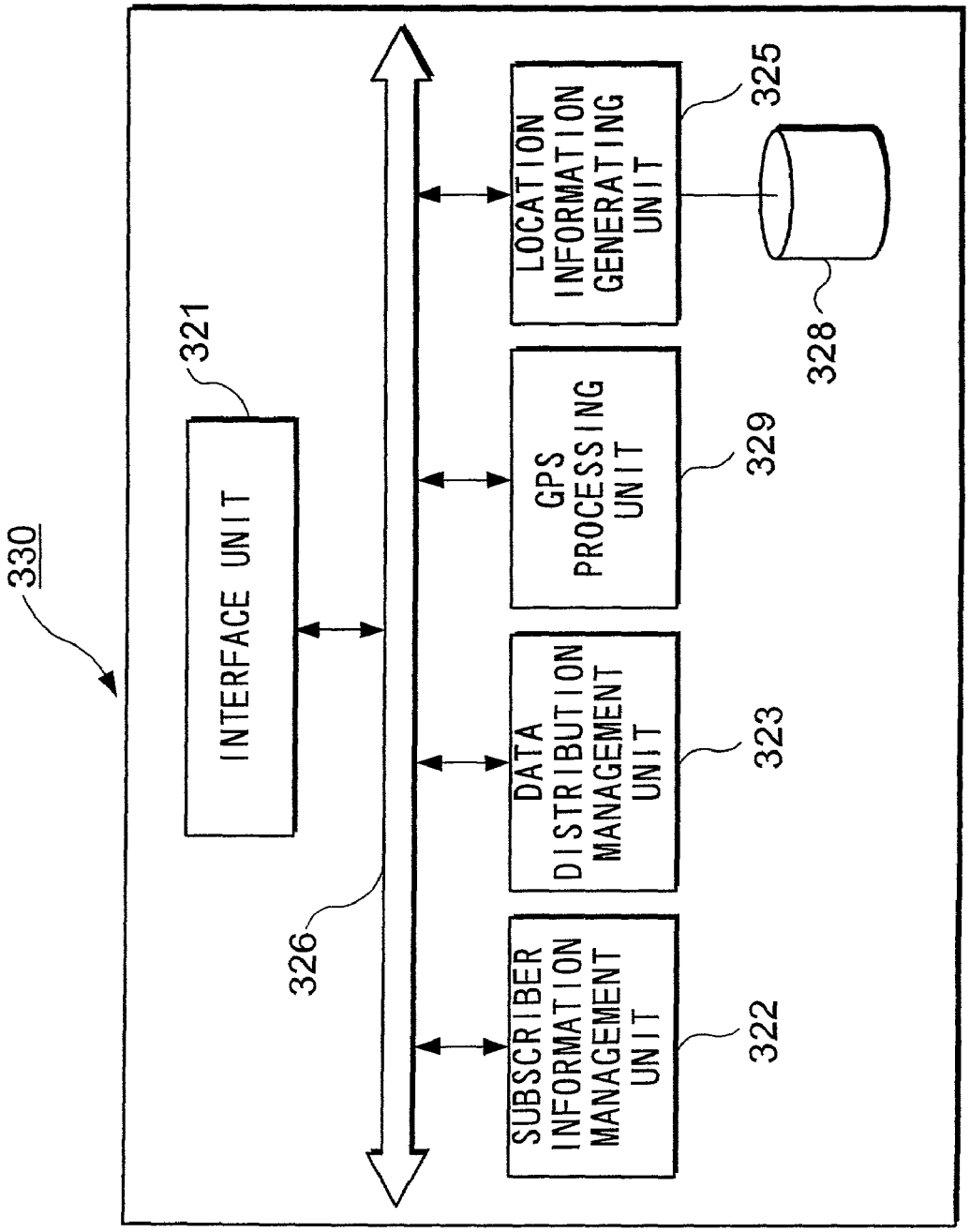
FIG. 17 is a block diagram showing a configuration of a gateway server according to the third embodiment.

FIG. 17 is a block diagram showing a configuration of the gateway server 330 according to the third embodiment. In this diagram, the component elements shared by the second embodiment shown in FIG. 14 are designated by the same reference numerals, respectively, and will not be described. The gateway server 330 of the third embodiment is different from the corresponding server of the second embodiment in that it includes a location information generating unit 325 for generating the location information based on the base station ID and an area code data base 328.

The location information generating unit 325 generates the location information of the mobile station 101 in the way described below.

The up signal transmitted from the mobile station 101 toward the IP servers 500A, 500B and so on contains the URL of the IP servers 500A, 500B and so on to which the signal is transmitted and the mobile-station ID of the transmitter mobile station 100. Further, the ID of each device is added to the up signal sequentially as it is relayed by each device in the mobile communication network. Specifically, after the up signal is transmitted from the mobile station 100, the base station ID of the base station 210 is first added to the signal when received by the base station 210. Further, the packet subscriber processing unit ID of a packet subscriber processing unit 310 is added to the signal when received by the same processing unit 310.

Thus, the up signal transmitted from the mobile station 101 comes to contain the URL of any one of the IP servers 500A, 500B and so on of the destination, the mobile station ID, the base station ID and the packet subscriber processing unit ID by the time it is received by the gateway server 330. The location information generating unit 325, by analyzing these ID information, can grasp which mobile station 101 is located in the radio zone of which base station 210.

Also, the location information generating unit 325 includes an area code table 328 having stored therein the base station IDs and corresponding area codes of the areas where the respective base stations having the particular base station IDs are located. The location information generating unit 325 searches the area code table 328 using, as a search key, the base station IDs covering the mobile station 101. The area code obtained as the result of this operation and the mobile station ID of the mobile station 101 described above are determined as the location information of the mobile station 101.

FIG. 18 is a diagram showing a data format of the area code table 328.

This area code table 328 has stored therein the "base station IDs" that are effective in the mobile communication network as the information indicating the location and corresponding "area codes" that can be comprehended, as the information indicating the location, by the IP servers 500A, 500B and so on located outside the network.

The base station ID group "BS001 to BS005" shown in the drawing, for example, substantially corresponds to the areas defined as "1-chome, Shibuya-ku, Tokyo", and therefore the area code "CODE001" indicating "1-chome, Shibuya-ku" is stored as information corresponding to the base station group.

The other parts of the configuration are similar to those of the second embodiment described above and therefore will not be described.

C-1: Operation of Third Embodiment

Now, the operation of the third embodiment will be explained with reference to FIG. 19.

Figure 15:
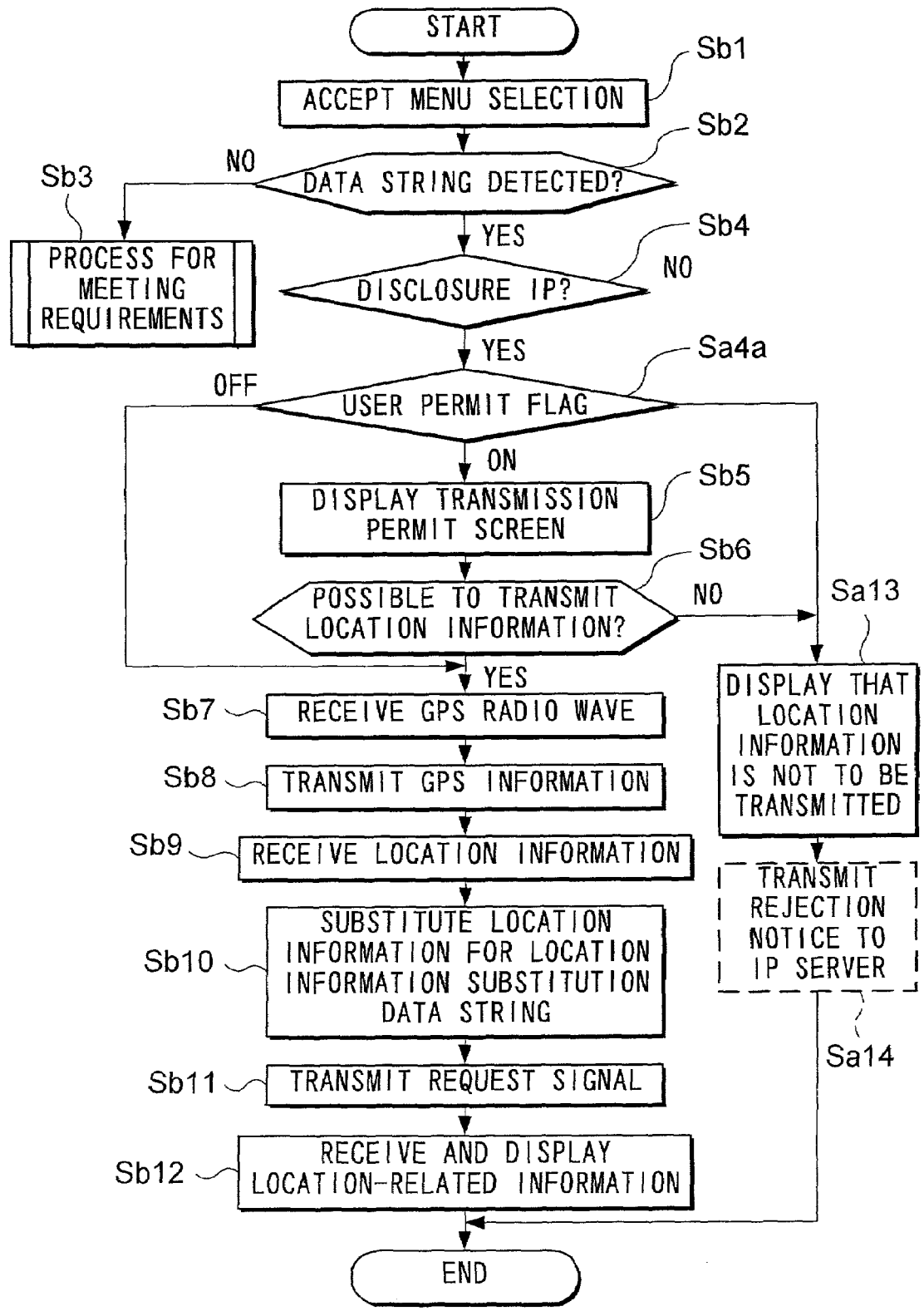
FIG. 15 is a flowchart showing the operation of the second embodiment.

The flow shown in this drawing is different from that of the second embodiment shown in FIG. 15 in that steps Sc7 to Sc11 are executed in place of steps Sb7 to Sb9.

Specifically, in step Sc7, the microcomputer 101b of the mobile station 101 determines a location measuring method for generating the location information. In the concrete, as described above, the location information substitution data string contained in the hyper link character string is detected, and it is determined whether the character string added to the same data string is ".gps" or ".bs".

In the case where the determination is that the location measuring method is the network-type GPS, the microcomputer 101b activates the GPS receiving unit 101f to receive the radio wave sent out from the GPS satellites in step Sc8. In step Sc9, the ID information of the GPS satellites and the time point when the radio waves are sent out are extracted from the radio waves received, and the GPS information having added thereto the time point at which the radio waves are received is transferred to the gateway server 330. On the other hand, the GPS processing unit 329 of the gateway server 330 calculates the location information based on the GPS information transferred from the mobile station 101 and transmits it to the mobile station 101. In step Sc10, the microcomputer 101b of the mobile station 101 receives the location information transmitted from the gateway server 330.

In the case where the determination in step Sc7 is the location measuring method using the base station ID, on the other hand, the microcomputer 101b transmits to the gateway server 330 a request signal (up signal) requesting the generation of the location information in step Sc11. This request signal, as described above, contains the mobile station ID of the mobile-station 101 which transmits the same signal, and further has progressively added thereto the ID of each device relaying the request signal as it is transmitted to the gateway server 330. In other words, by the time when the request signal transmitted from the mobile station 101 is received by the gateway server 330, it comes to have added thereto the mobile station ID, the base station ID and the packet subscriber processing unit ID. The location information generating unit 325, by analyzing these ID information, grasps, based on the base station ID, which mobile station 101 is located in the radio zone of which base station 210, and further searching the area code table 328 with this base station ID as a key, transmits the obtained area code to the mobile station 101 as the location information of the mobile station 101. In step Sc10, the microcomputer 101b of the mobile station 101 receives the location information transmitted from the gateway server 330.

The other steps represent the operation shared by the second embodiment and therefore will not be described.

According to this third embodiment, the IP server 500 causes the submenu data supplied to the mobile station 101 to contain the information indicating the location measuring method for the location information, thereby making it possible to obtain the location information calculated by the desired location measuring method.

C-2 Modifications of Third Embodiment (1) Designation of Priority Order-of Location Measuring Methods According to the third embodiment, a location measuring method is designated by adding, to the hyper link character string, the network-type GPS form ".gps" or the location measuring method ".bs" using the base station ID. The IP server 500, however, can also add the data of a plurality of location measuring methods with the order of priority specified.

In such a case, the hyper link character string is expressed as

"http://xxx.co.jp/cgibin/
   posi.cgi?posit=BG&qos=NULLQOS&area=
   NULLAREA&time=NULLTIME&state=NULLSTATE", where "posit=BG" designates the location measuring method B (location measuring method using the base station) and the method G (location measuring method using the network-type GPS) arranged in the descending order of priority. Also, the mobile station 101 substitutes the employed location measuring method for the "NULLQOS" portion of "qos=NULLQOS," so that the information as to which location measuring means has been used for location measurement by the mobile station 101 is notified to the IP server 500.

The mobile station 101, after executing the location measurement by an executable location measuring means, generates the location information or the like and transmits the following up data string, for example, to the IP server 500 of the destination.

"http://xxx.co.jp/cgi-bin/
   posi.cgi?posit=BG&qos=G&area=N35.716931E141.
   722775& time=20010208153344.5+0900&state=
   MEETING"

which indicates that the mobile station 101 has measured its own location using the location measuring method (G) with GPS in addition to the location information, the measurement time thereof and the user state. By receiving this data string, the IP server 500 can acquire these information.

Also, the IP server 500 can designate the quality of the location information by a similar method. The location measuring methods employed in this embodiment are roughly divided into two types, the location measuring method using the base station ID described above (.bs) and the location measuring method using the network-type GPS (.gps). The mobile station 101 can acquire the location information of a plurality of quality levels by changing the number of the GPSs or the base stations used for location measurement.

The quality may be defined, for example, as the accuracy of the location information acquired, i.e. how accurately the information indicates the location of the object of location measurement (the mobile communication terminal in the present case).

According to this method, the time required for location measurement is inversely proportional to the location measurement accuracy, depending on the number of the GPSs or the base stations used for location measurement. Specifically, the location measurement using a multiplicity of GPSs or base stations requires a long time for location measurement though high in location measurement accuracy. In the case where it is desired to acquire the location information in as short a time as possible, on the other hand, it is better to use a smaller number of GPSs or base stations but, it reduces the location measurement accuracy.

Furthermore, the location measurement with GPS is a method in which the radio waves from a plurality of GPS satellites are received to measure the location by latitude and longitude. Therefore, the accuracy is higher but a longer time is consumed than the location measuring method using the base stations based on the location of the base station covering a cell in which the mobile station 101 is located.

As a result, the IP server 500 designates the desired quality considering the trade-off between the location measurement accuracy and the time required for location measurement according to the purpose for which and the degree of emergency to which the location information is used. In this way, a great variety of needs, of the information-acquiring party, can be met.

More specifically, the quality of the location information may be set in five levels of "B2" to "G4" as shown in FIG. 20A. In this case, as shown in the drawing, the accuracy is highest (high accuracy) but the longest time is required (time; very deteriorated) for "G4" using four GPSs for location measurement. Conversely, the measurement result is obtained earlier (time; much improved) at the sacrifice of a lower accuracy (low accuracy) for "B2" which uses only two base stations for location measurement.

The IP server 500 designates the parameters shown in FIG. 20B in a hyper link character string and transmits it to the mobile station 101 thereby to designate the aforementioned quality level indirectly.

Assume, for example, that the IP server 500 desires to acquire as accurate location information as possible at the sacrifice of a long time. In such a case, the parameter "accuracy given priority"="A" is designated by referring to the table of FIG. 20B. Specifically, the hyper link character string is described in the following way:
"http://xxx.co.jp/cgi-bin/
search.cgi?posit=A&qos=NULLQOS&area=
NULLAREA&time=N ULLTIME" where the IP server 500 expresses a request to give priority to the accuracy by the character string "posit=A".

The mobile station 101 that has received this data string refers to the comparison table (FIG. 20A) including the location measurement accuracy and corresponding location measuring methods stored in itself and carries out the location measurement by employing a location measuring method which most meets the designated quality conditions. In accordance with the desire of the IP server for "priority to accuracy", the most accurate measuring method "G4" is employed to carry out the location measurement. Each of the data such as the location information obtained as a result of location measurement, the employed location measuring method, and the measurement time is substituted for a predetermined substitution character string of the transmission data string and transmitted to the IP server 500.

In the process, the data string transmitted from the mobile station 101 to the IP server 500 is as follows:
"http://xxx.co.jp/cgi-bin/
search.cgi?posit=A&qos=G4&area=N35.716931E141. 72277 5&time=20010208153344.5+0900", where "qos=G4" indicates that the location measuring method "G4" has been employed.

This method of designating a quality condition presupposes that parameters (FIG. 20B) for designating a quality condition are stored beforehand in the party acquiring the location information, i.e. the IP server 500. The same parameters are also stored in the mobile station 101, which selects one of the methods usable by itself for measurement in accordance with a parameter designated by the IP server 500.

The forms of the parameters are not limited to those in this modification but may be the ones unified and coordinated between the acquisition side and the supply side of the location information. Also, the table of the quality conditions and corresponding measuring methods shown in FIG. 20A are not limited to the form employed in this modification, but may take a different form depending on the location measuring program stored in the microcomputer 110b of the mobile station 101 and the performance thereof.

As described above, this method makes it possible to supply the location information of an accuracy required by the IP server 500.

(2) Also in this third embodiment, what has been described in the modifications of the first embodiment is applicable. Specifically, the modifications (2) to (11) of the first embodiment are applicable to this third embodiment.

D: FOURTH EMBODIMENT

The three embodiments described above assume the following cases. Firstly, the mobile station 101 supplies the IP server 500 with the location information of the mobile station 101 in order to acquire, from the IP server 500 supplying information, the information (the restaurant information, for example) related to the location in which it is located. Secondly, the IP server 500 requests the mobile station 101 to supply the location information in order to acquire the location information of the mobile station 101. The first to third embodiments all presuppose that the hyper link character string has been received in advance from the IP server 500 by the mobile station 101, and the character string is returned, after the mobile station 101 measures its own location, carrying the generated location information and other information such as the location information acquisition time. In other words, the mobile station 101, after receiving the substitution character string containing the location information substitution character string, substitutes the specific location information or the like acquired by the mobile station 101 for the corresponding portion of the received character string and returns it to the IP server 500.

In the fourth embodiment described below, unlike the first to third embodiments, the mobile station 101 first generates, independently, the location information of itself in response to an instruction from the user. Then, the mobile station 101 transmits the result added to a URL for connecting to an arbitrary, network-connected map site, thereby to transmit the location information of itself to a desired destination. The party that has received this location information accesses the map site indicated by the URL and displays the map indicating the location of the transmitter mobile station 101.

This method is useful, for example, to the user desirous of notifying his/her location to a friend waiting for him/her. Another useful application is as follows. In the case where friends want to notify their location information to each other, for example, the user of a mobile station 101 instructs the particular mobile station 101 to notify the location thereof so that the data string of the URL indicating its own location information is generated, while at the same time transmitting a data string requesting another mobile station 101 carried by the other party friend to notify the location of the mobile communication terminal of the destination. The mobile station 101 of the friend that has received this request returns the location information of itself to the mobile station 101 of the transmitter friend in a manner similar to the one explained above in the first embodiment.

By way of explanation, the transmitter mobile station 101 starting to transmit the location information thereof is referred to as the mobile station 101A, and the mobile station 101 of the destination as the mobile station 110B.

D-1: Configuration of Fourth Embodiment

The configuration of the mobile station 110A according to this embodiment is similar to that of the first embodiment but different only in that the microcomputer 101b has a self location notification program for notifying the location of itself.

This self location notification program is started by the user of the mobile station 110A inputting, by key operation, the telephone number or the name of the destination registered in the telephone directory on a screen such as shown in FIG. 21A displayed on the information display unit 101d. The self location notification program accepts the self location notification request from the user and generates the location information by measuring the location of itself by a method similar to the one described in the first embodiment.

The URL for notifying the self location information is configured of:
"http://mapserv.mapfan.com/cgi-bin/map/ mapserv.cgi?MAP=selflocation information&ZM= 9&SZ=120, 120&OPT=30500011&P=e21 self location information".

This "self location information" portion (hereinafter referred to as the "self location information substitution data string") is substituted for by the specific data of the self location information already acquired.

The URL character string "http://mapserv.mapfan.com" shown here is an example of the map site and may be any site that can accessed through the Internet and performs the service of providing the location information of a terminal. The user of the mobile station 110A is required to sign a service agreement, in advance, with a common carrier for managing a terminal or a map site information provider and prestore the agreed information in its own memory.

Assuming that the self location information data measured is "E139.44.45.80 N35.40.30.18", the data string after substitution is expressed as
"http://mapserv.mapfan.com/cgi-bin/map/ mapserv.cgi?MAP=E139.44.45.80N35.40.30.18&ZM= 9& SZ=120, 120&OPT=30500011&P= e21E139.44.45.80N35.40.30.18" This constitutes the location information data string (hereinafter referred to as the "self location information data string") for notifying the self location to a destination. This self location information data string is embedded in the following data string as location information and-transmitted to the destination:
"<IMG SRC="cti-pos://---.smail/snd-cgi?=U&subject=imakoko&address=destination&body= self location information data string">"

In the case where the telephone number of the mobile station 110B constituting the destination is "090-1234-5678", for example, the data string transmitted to the mobile station 101B is expressed as
"<IMG SRC="cti-pos://---.smail/ sndcgi?=U&subject=imakoko&address=0901234678& body=http://mapserv.mapfan.com/cgi-bin/map/ mapserv.cgi?MAP=E139.44.45.80N35.40.30.18&ZM= 9& SZ=120, 120&OPT=30500011&P=e21E139.44.45.80 N35.40.30.18">".

The mobile station 110A can notify the location of itself by transmitting this transmission data string to the mobile station 110B.

In the case where it is desired to acquire the location information of the mobile station 101B constituting the destination in addition to the notification of the self location information, on the other hand, the data string requesting the location information of the mobile station 101B is added to the aforementioned transmission data string. In such a case, the transmission data string is given as
"<IMG SRC="cti-pos://---.smail/snd-cgi?=U&subject= imakoko&address=09012345678&body=http://mapserv. mapfan.com/cgi-bin/map/ mapserv.cgi?MAP=E139.44.45.80N35.40.30.18&ZM= 9& SZ=120, 120&OPT=30500011&P=e21E139.44.45. 80N35.40.30.18"<IMG SRC="cti-pos://---.smail/snd-cgi?=U&subject=imakoko&address=09012345679& body=http://mapserv.mapfan.com/cgi-bin/map/ mapserv.cgi?MAP=NULLAREA&ZM=9&SZ=120, 120&OPT=30500011&P=e21NULLAREA">">". The character string "address=09012345679" in the second "address=" designates the telephone number for return transmission, i.e. the telephone number of the mobile station 110A. Also, the location information substitution data string "NULLAREA" requests the mobile station 101B to supply the location information. The mobile station 101B that has detected this data string measures the location of itself by a similar method to the first embodiment, and transmits the location of itself to the mobile station 101A.

D-2: Operation of Fourth Embodiment

Figure 22:
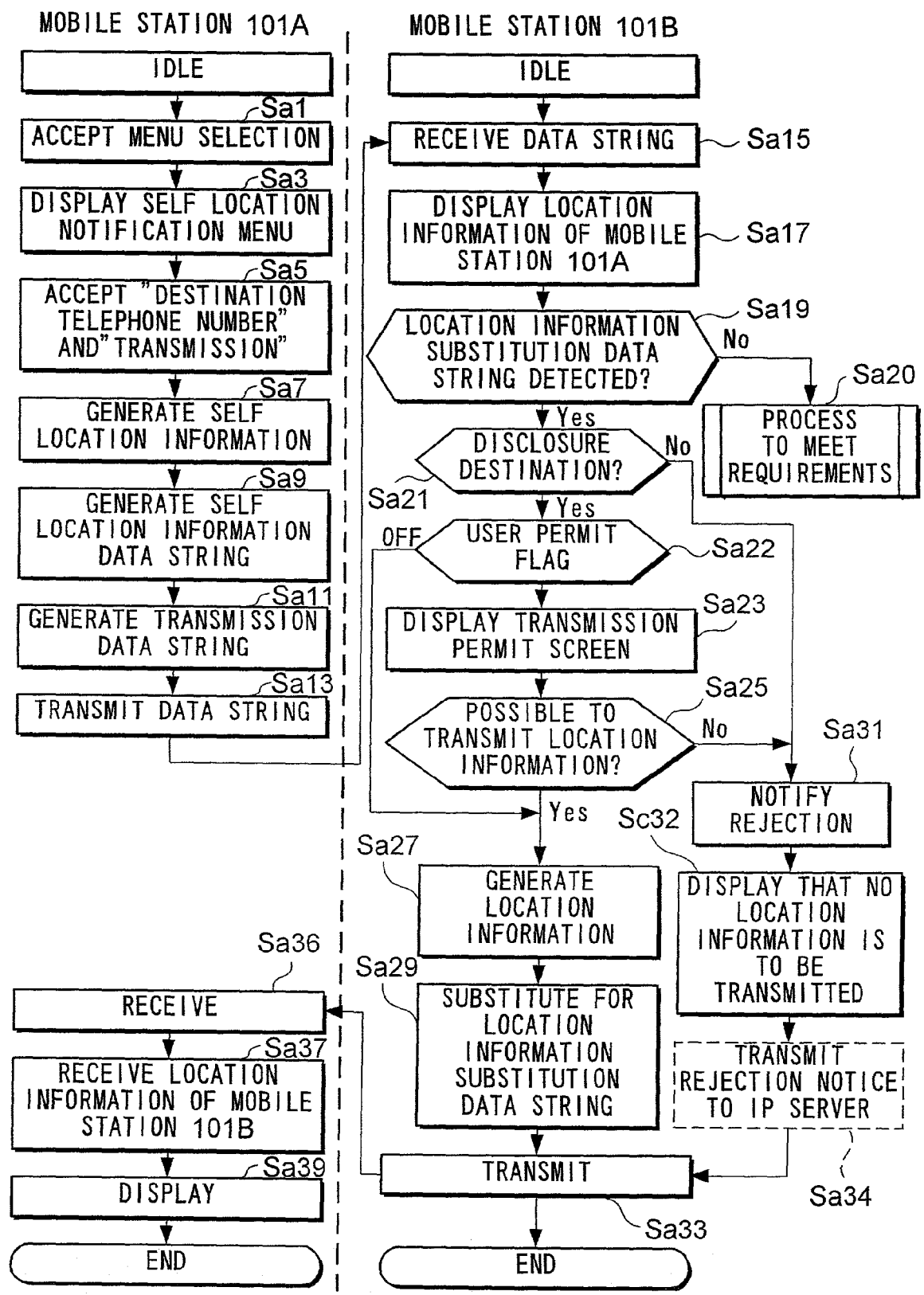
FIG. 22 is a flowchart showing the operation of a microcomputer included in a mobile station according to the fourth embodiment.

The operation of the fourth embodiment will be explained below with reference to FIG. 22.

First, the mobile station 101A accepts the menu selection by the user in step Sa1. In the case where the user selects "self location notification menu", the mobile station 101A displays the self location notification menu such as shown in FIG. 21A (step Sa3).

On the self location notification menu displayed on the information display unit 101d, the user first inputs, by key operation, the telephone number or the name registered in the telephone directory of the mobile station 101B constituting the destination, and then selects and executes the "enter".

A screen (FIG. 21B) asking the user whether the user desires to acquire the location information of the mobile station 101B in addition to the self location information notification is displayed. The user selects YES or NO on the screen by key operation, and then executes "transmission".

The microcomputer 110b of the mobile station 110A accepts the request for self location information notification and/or the location information acquisition (step Sa5), and generates the self location information in accordance with the location measuring program stored in the microcomputer 101b (Sa7).

Then, in step Sa9, the location information generated in the preceding step is substituted for the self location information substitution data string thereby to generate the self location information data string. As described above, the following self location information data string is generated as a result: "http://mapserv.mapfan.com/cgi-bin/map/
 mapserv.cgi?MAP=E139.44.45.80N35.40.30.18&ZM= 9&SZ=120, 120&OPT=30500011&P=e21E139.44.45. 80N35.40.30.18"

(in this case, the location measurement shows that the mobile station 110A is located at "E139.44.45.80 N35.40.30.18").

This self location information data string, as described above, is for indicating the self location on the map site by adding the self location information (the location information expressed in latitude and longitude in this case) to the URL of the existing map site.

The party that has received the URL of this self location information data string can grasp the location of the transmitter terminal or the mobile station 110A in this case, on the map site, by accessing the map site shown by the URL.

Upon completion of generating the self location information data string in step Sa9, the data string is generated for transmitting the self location information data string to the mobile station 101B constituting the destination (step Sa11). In this case, the telephone number of the mobile station 101B accepted in step Sa5 and the self location information data string generated in the preceding step are built in the transmission data string (step Sa11).

In the case where the telephone number of the mobile station 101B constituting the destination is "090-12345678", for example, the data string transmitted to the mobile station 101B is expressed as
"<IMG SRC="cti-pos://---.smail/snd-cgi?=U&subject=imakoko&address=09012345678& body=http://mapserv.mapfan.com/cgi-bin/map/ mapserv.cgi?MAP=E139.44.45.80N35.40-30.18&ZM=9&SZ=120, 120&OPT=30500011&P= e21E139.44.45.80N35.40.30.18">"

Also, in the case where the user of the mobile station 101A wants to acquire the location information of the mobile station 101B, it is necessary to add also the data string requesting the location information from the mobile station 101B. Specifically, the data string is
"<IMG SRC="cti-pos://---.smail/snd-cgi?=U&subject=imakoko&address=09012345678& body=http://mapserv.mapfan.com/cgi-bin/map/ mapserv.cgi?MAP=E139.44.45.80N35.40.30.18&ZM= 9&SZ=120, 120&OPT=30500011&P=e21E139.44.45. 80N35.40.30.18"<IMG SRC="cti-pos://---.smail/snd-cgi?=U&subject=imakoko&address=09012345679& body=http://mapserv.mapfan.com/cgi-bin/map/ mapserv.cgi?MAP=NULLAREA&ZM=9&SZ=120, 120&OPT=30500011&P=e21NULLAREA">">"

The transmission data string generated in this way is transmitted to the mobile station 101B in step Sa13.

The microcomputer 101b of the mobile station 101B (step Sa15) that has received this data string detects that the data string thus received contains the URL indicating the location information of the mobile station 110A and accesses the URL automatically, thereby displaying the map indicating the location of the mobile station 110A on the information display unit 101e of the mobile station 101B (step Sa17).

The subsequent operation in the mobile station 110B (the operation of steps Sa19 to Sa39) is similar to the corresponding operation of the first embodiment and therefore each step will not be described in detail. The mobile station 110B, after ascertaining whether the location information is permitted to be supplied to the mobile station 110A, i.e. whether the mobile station 110A is registered as a disclosure destination or whether the permission can be obtained from the user or not, measures the location and generates the location information of the mobile station 101B and returns the result to the mobile station 110A.

In the case where the request to supply the location information is rejected, as in the first embodiment, the rejection is notified by returning the received data as it is without substitution.

Finally, in step Sa39, the microcomputer 101b of the mobile station 101A detects that the received data string contains the URL indicating the location information of the mobile station 101B and by accessing the particular URL automatically, displays the map indicating the location of the mobile station 101B on the information display unit 101e thereby to end the operation.

Also in the fourth embodiment, what is described with reference to the modifications of the first embodiment is applicable. Specifically, the modifications (3) to (11) of the first embodiment are applicable.

The invention claimed is:

1. A location reporting method, comprising the steps of:
receiving at a mobile communication terminal, from a computer through a mobile communication network, data comprising a character string representing a request for location information;
identifying, with said mobile communication terminal, a description format for said requested location information;
acquiring at said mobile communication terminal location information indicating a location of said mobile communication terminal;
said mobile communication terminal upon acquisition of said location information, substituting said acquired location information for said character string in accordance with said description format; and
transmitting a resulting data to said computer as up data.

2. A location reporting method as described in claim 1, wherein said steps performed by said mobile communication terminal further include the step of: detecting whether said character string contains requesting location information acquisition time, and if said requesting location information acquisition time is detected then;
wherein, said acquiring step further includes acquiring said acquisition time of said location information; and
wherein, said substituting step further includes adding said acquired location information acquisition time before transmission.

3. A location reporting method as described in claim 1, wherein said steps performed by said mobile communication terminal further include the steps of: detecting whether said data contains requesting information on a state of a user, and if said requesting information on a state of a user is detected, then; determining a state of a user of said mobile communication terminal from said acquired location information; and
wherein, said substituting step further includes adding said information on said determined state of said user before transmission.

4. A location reporting method as described in claim 1, wherein said steps performed by said mobile communication terminal further include the steps of: detecting whether said data contains requesting information on a state of a user and if said requesting information on a state of a user is detected then; prompting a user of said mobile communication terminal to select a state; and wherein, said substituting step further includes adding said information on said selected state of said user before transmission.

5. A location reporting method as described in claim 1, wherein said transmitting step includes transmitting, to said computer, said data that includes said substituted acquired information as said up data.

6. A location reporting method as described in one of claims 1-4, wherein, said data contains information indicating an address to which location information is to be transmitted.

7. A location reporting method as described in claim 1, wherein said data contains a plurality of addresses;

wherein, said steps performed by said mobile communication terminal include the step of: obtaining said plurality of the addresses from said data; and wherein, said transmitting step includes transmitting said resulting data to said plurality of the addresses in succession.

8. A location reporting method as described in claim 1, wherein, after said data is received, said location information is acquired and transmitted at predetermined intervals.

9. A location reporting method as described in claim 8, wherein, said transmitting step includes transmitting said location information acquired at said predetermined intervals during the period from a time point to another time point designated by said data.

10. A location reporting method as described in claim 8, wherein, said transmitting step includes, accumulating said location information acquired at said predetermined intervals, transmitting said accumulated location information acquired at said predetermined intervals at a time point designated by said data.

11. A location reporting method as described in claim 1, wherein, said acquiring step includes generating, by said mobile communication terminal, the location of said mobile communication terminal using a global positioning system.

12. A location reporting method as described in claim 1, wherein, said acquiring step includes the steps of:

transmitting, by said mobile communication terminal, a request signal requesting a predetermined node of said mobile communication network to generate the location information;

generating, by said predetermined node, the location information of said mobile communication terminal in response to said request signal and transmitting said location information to said terminal; and receiving, by said mobile communication terminal, the location information transmitted from said predetermined node.

13. A location reporting method as described in claim 12, further comprising the step of: receiving, by said mobile communication terminal, radio waves transmitted from a plurality of satellites constituting a global positioning system;

wherein, said step of transmitting said request signal includes transmitting information contained in a plurality of said received radio waves, together with said request signal; and wherein, said step of generating said location information includes generating said location information using said information contained in said plurality of said received radio waves.

14. A location reporting method as described in claim 1, wherein, disclosure information indicating whether said location information is to be disclosed to said computer is stored, in advance, in a predetermined storage means.

15. A location reporting method as described in claim 14, wherein, said transmitting step includes transmitting, in the case of receiving said data from said computer to which said location information is not to be disclosed, a notice of rejection of provision of said location information to said computer.

16. A location reporting method as described in claim 1, wherein, said data contains information designating a method of location measurement;

wherein, said mobile communication terminal is configured to acquire location information by any of a plurality of different location measuring methods and said acquiring step includes the step of selecting a location measuring method designated by said data from among said plurality of said location measuring methods; and wherein, said transmitting step includes transmitting, as part of said up data, said location information acquired by said selected location measuring method in said acquiring step.

17. A location reporting method as described in claim 16, wherein, said data contains a designation of a quality condition of location information; and wherein, said step of selecting a location measuring method includes selecting a location measuring method based on said designated quality condition.

18. A location reporting method as described in claim 16, wherein, said plurality of location measuring methods include any one of a method of using a global positioning system and, a method of identifying a base station covering a range in which said mobile communication terminal is located.

19. A location reporting method as described in claim 16, wherein, said location information contains:

latitude and longitude; or information based on an administrative classification.

20. A location reporting method as described in claim 1, wherein, said computer is an information providing server configured to provide said mobile communication terminal with location-related information related to said location of said mobile communication terminal.

21. A location reporting method as described in claim 1, wherein, said computer is a terminal connected to a network that is capable of transmitting and receiving by radio or wire.

22. A location reporting method as described in claim 1, wherein, said mobile communication terminal is a portable telephone for performing phone conversations by radio.

23. A location reporting method for reporting, to a predetermined computer, location information of a mobile communication terminal acquired in a mobile communication network serving the mobile communication terminal which is capable of performing radio communication, comprising the steps of:

acquiring by said mobile communication terminal location information indicating said location of said mobile communication terminal for use by a destination mobile communication terminal;

said mobile communication terminal retrieving from memory a pre-stored network address and a character string, the pre-stored network address indicative of a server that provides map location information that is accessible by said destination mobile communication terminal in conjunction with said location information; and transmitting, by said mobile communication terminal, said pre-stored network address for receipt by said destination mobile communication terminal after substituting said acquired location information for said character string.

24. A location reporting method as described in claim 23, wherein, said acquiring step includes generating by said mobile communication terminal the location of said mobile communication terminal using a global positioning system.

25. A location reporting method as described in claim 23, wherein, said computer is a terminal connected to a network and capable of transmitting and receiving by radio or wire.

26. A location reporting method as described in claim 23, wherein, said mobile communication terminal is a portable telephone for performing phone conversations by radio.

27. A mobile communication terminal, comprising:

communication means for receiving through a mobile communication network data containing a character string comprising a request for location information from a computer; and a processor configured to identify a description format for said requested location information;

said processor further configured to acquire location information indicating a location of said mobile communication terminal;

wherein said processor is further configured to substitute said acquired location information for at least a portion of said character string in accordance with said description format, wherein said communication means is further configured to transmit said data that includes substituted information as up data to said computer.

28. A mobile communication terminal as described in claim 27,
wherein said processor is further configured to detect whether said character string includes a request for a location information acquisition time, and if representation of said request for a location information acquisition time is detected, then;
wherein, said processor is further configured to acquire said location information acquisition time; and
wherein, said communication means is further configured to add said acquired location information acquisition time to said data before transmission of said up data.

29. A mobile communication terminal as described in claim 27,
wherein said processor is configured to detect whether said data contains a request for information on a state of a user, and if said request for information on a state of a user is detected, then
said processor is further configured to determine a state of a user of said mobile communication terminal from said acquired location information; and wherein, said communication means is further configured to add said information on said determined state of said user to said up data before transmission.

30. A mobile communication terminal as described in claim 27,
wherein said processor is further configured to detect whether said data contains a request for information on a state of a user, and if said request for information on a state of a user is detected, then;
means for prompting a user of said mobile communication terminal to select his/her own state is enabled; and
wherein, said communication means is further configured to add information on said selected state of said user to said up data before transmission.

31. A mobile communication terminal as described in claim 27,
wherein said processor is further configured to detect whether said data contains a plurality of addresses; and
wherein said processor is configured to obtain said plurality of the addresses from said data; and
wherein, said communication means is further configured to transmit said up data to each of said plurality of addresses in succession.

32. A mobile communication terminal as described in claim 27, wherein,
after receiving said data, said location information is acquired at predetermined intervals before transmission.

33. A mobile communication terminal as described in claim 32, wherein,
said communication means is further configured to transmit said location information acquired at said predetermined intervals during the period from a time point to another time point designated by said data.

34. A mobile communication terminal as described in claim 32, wherein,
said communication means is further configured to accumulate said location information acquired at said predetermined intervals before transmitting said location information at a time point designated by said data.

35. A mobile communication terminal as described in claim 27, wherein,
said processor is further configured to generate a location of said mobile communication terminal using a global positioning system.

36. A mobile communication terminal as described in claim 27, wherein,
said processor is further configured to direct transmission of a request signal requesting a predetermined node of said mobile communication network to generate said location information; and
and direct receipt of said location information transmitted, in response to said request signal, from said predetermined node.

37. A mobile communication terminal as described in claim 36, further comprising:
means for receiving radio waves transmitted from a plurality of satellites constituting a global positioning system,
wherein, said processor is further configured to direct transmission of information contained in said plurality of received radio waves, together with said request signal.

38. A mobile communication terminal as described in claim 27, wherein,
said processor is capable of acquiring location information by a plurality of different location measuring methods, and said data contains information designating a location measuring method;

wherein, said processor is further configured to select a location measuring method designated by said data, from among said plurality of different location measuring methods; and wherein, said communication means is further configured to transmit, carried on said up data, location information acquired by said processor according to said selected location measuring method.

39. A mobile communication terminal as described in claim 38, wherein
said data contains data designating a quality condition of location information; and
wherein, said processor is further configured to select a location measuring method based on said designated quality condition.

40. A mobile communication terminal as described in claim 38, wherein,
said processor is configured to direct a location measuring method that includes either one of
using a global positioning system, or
identifying a base station covering an area in which said mobile communication terminal is located.

41. A mobile communication terminal as described in claim 38, wherein
said location information contains:
latitude and longitude; or
information based on an administrative classification.

42. A mobile communication terminal as described in claim 27, further comprising:
storage means for storing disclosure information indicating whether said computer is a computer to which said location information is to be disclosed,
wherein, said communication means is further configured, in a case of receiving data from said computer to which said location information is to be disclosed, to add said acquired. location information to said received data before transmission to said computer as up data.

43. A mobile communication terminal as described in claim 42, wherein,
said communication means is further configured to transmit, in a case of receiving data from a computer to which said location information is not to be disclosed, a notice for rejecting provision of said location information.

44. A mobile communication terminal as described in claim 27, wherein
said mobile communication terminal is a portable telephone configured to perform phone conversations by radio waves.

45. A mobile communication terminal served by a mobile communication network and reporting location information of itself to a predetermined computer, comprising:
acquiring means for acquiring location information indicating a location of said mobile communication terminal, for use by an arbitrary terminal; and
transmitting means for substituting said acquired location information for a character string included with a network address of a server, the server configured to supply map information based on said location information, said map information displayable by said arbitrary terminal,
wherein said transmitting means is configured to transmit said address and said location information for receipt by said arbitrary terminal to allow a present location of said mobile communication terminal to be mapped by said arbitrary terminal using said location information and said network address to obtain map information.

46. A mobile communication terminal as described in claim 45, wherein, said acquiring means generates, said location of said mobile communication terminal using a global positioning system.

47. A mobile communication terminal as descibed in claim 45, wherein, said mobile communication terminal is a portable telephone for performing phone conversations by radio.

48. A mobile communication terminal, comprising:
a radio unit configured to receive wirelessly transmitted data that includes a predetermined data string, the predetermined data string comprising a request for a current location of said mobile communication terminal;
a microcomputer configured to direct acquisition of location information indicative of a current location of said mobile communication terminal in response to existence of said request;
wherein said microcomputer is configured to replace at least a portion of said predetermined data string with said acquired location information; and
wherein, after replacement with said location information, said radio unit is configured to wirelessly transmit a resulting data as up data in response to said request.

49. The mobile communication terminal of claim 48, wherein said data includes a request for a state of a user, wherein said state comprises a selectable status indication of a user.

50. The mobile communication terminal of claim 49, wherein said selectable status indication is determinable by said microcomputer.

51. The mobile communication terminal of claim 49, wherein said selectable status indication is manually selectable by a user of said mobile communication terminal.

52. The mobile communication terminal of claim 49, wherein said selectable status indication comprises at least one of at home, moving in a car, moving on a train, or in a meeting.

53. The mobile communication terminal of claim 48, wherein said microcomputer is further configured to determine, prior to transmission of said location information, whether a source of said data is authorized to receive said location information.

54. The mobile communication terminal of claim 48, further comprising an information display unit configured to display a menu that includes selectable menu items in response to receipt of said data, wherein at least some of said menu items include said predetermined data string.

55. The mobile communication terminal of claim 48, wherein said data includes a plurality of destination addresses and said up data is transmittable in succession to each of said destination addresses.

56. The mobile communication terminal of claim 48, wherein said microcomputer is configured to direct acquisition of location information at predetermined time intervals, and said radio unit is configured to transmit said up data each time said location information is acquired until a time specified in said data is reached.

57. The mobile communication terminal of claim 48, wherein said radio unit is configured to transmit said up data at a time specified in said data.

58. The mobile communication terminal of claim 48, wherein said data includes information designating a location information measurement method, wherein said microcomputer is configured direct acquisition of location information with said designated location information measurement method.

59. A location reporting method as described in claim 1, wherein said receiving step includes:
- displaying menu items in a menu window of said mobile communication terminal based on said data;
- receiving an input operation with said mobile communication terminal to select one of said menu items; and
- determining whether said character string is embedded in said selected one of said menu items.

60. A mobile communication terminal as described in claim 27, further comprising:
- means for displaying a menu window that includes menu items based on said data;
- means for accepting selection of one of said menu items; and
- means for determining if said character string is embedded in said selected one of said menu items.

61. A location reporting method as described in claim 1, wherein identifying, with said mobile communication terminal, a description format comprises accessing a format information file provided by said computer to identify said description format.

62. A mobile communication terminal as described in claim 27, wherein said processor is further configured to access a format information file provided by said computer to identify said description format.

* * * * *

UNITED STATES PATENT AND TRADEMARK OFFICE
CERTIFICATE OF CORRECTION

PATENT NO.         : 7,558,584 B2
APPLICATION NO. : 09/980434
DATED              : July 7, 2009
INVENTOR(S)        : Hiroyuki Yamamoto et al.

It is certified that error appears in the above-identified patent and that said Letters Patent is hereby corrected as shown below:

In column 36, line 51, please replace "and direct" with --direct.--.

In column 37, line 35, please delete "." between "acquired" and "location".

In column 38, line 2, please delete "," between "generates" and "said".

Signed and Sealed this

Eighth Day of September, 2009

David J. Kappos
*Director of the United States Patent and Trademark Office*